United States Patent [19]
Taniguchi et al.

[11] Patent Number: 5,221,939
[45] Date of Patent: Jun. 22, 1993

[54] PHOTOGRAPHIC CAMERA

[75] Inventors: Nobuyuki Taniguchi, Nishinomiya; Yoshinobu Kudo, Osaka; Manabu Inoue, Kobe; Shigeru Wada, Kishiwada; Michihiro Iwata, Sakai, all of Japan

[73] Assignee: Minolta Camera Kabushiki Kaisha, Osaka, Japan

[21] Appl. No.: 727,008

[22] Filed: Jul. 8, 1991

[30] Foreign Application Priority Data

| Jul. 9, 1990 | [JP] | Japan | 2-181872 |
| Jul. 9, 1990 | [JP] | Japan | 2-181873 |
| Jul. 9, 1990 | [JP] | Japan | 2-181874 |
| Jul. 9, 1990 | [JP] | Japan | 2-181875 |
| Jul. 9, 1990 | [JP] | Japan | 2-181876 |

[51] Int. Cl.⁵ .................................. G03B 1/18
[52] U.S. Cl. .......................... 354/173.1; 354/214
[58] Field of Search ............. 354/173.1, 173.11, 212, 354/214, 215

[56] References Cited

U.S. PATENT DOCUMENTS

| 4,482,924 | 11/1984 | Brownstein | 358/302 |
| 4,878,075 | 10/1989 | Cannon | 354/173.1 |
| 4,996,546 | 2/1991 | Pagano et al. | 354/76 |

FOREIGN PATENT DOCUMENTS

| 59-79236 | 5/1984 | Japan . |
| 60-17447 | 1/1985 | Japan . |
| 62-218952 | 9/1987 | Japan . |
| 62-229120 | 10/1987 | Japan . |
| 62-229121 | 10/1987 | Japan . |
| 2-151844 | 6/1990 | Japan . |

Primary Examiner—Michael L. Gellner
Assistant Examiner—Howard B. Blankenship
Attorney, Agent, or Firm—Burns, Doane, Swecker & Mathis

[57] ABSTRACT

A photographic camera capable of using a film having a magnetic surface. There is provided a magnetic head for writing and reading information on the magnetic surface of the film and a pad for pressing the magnetic surface on the film into contact with the head. The film travels between the magnetic head and the pad out of contact therewith until the initial loading of the film. The film is held between the magnetic head and the pad in contact therewith after the completion of the initial loading thereof is detected.

11 Claims, 33 Drawing Sheets

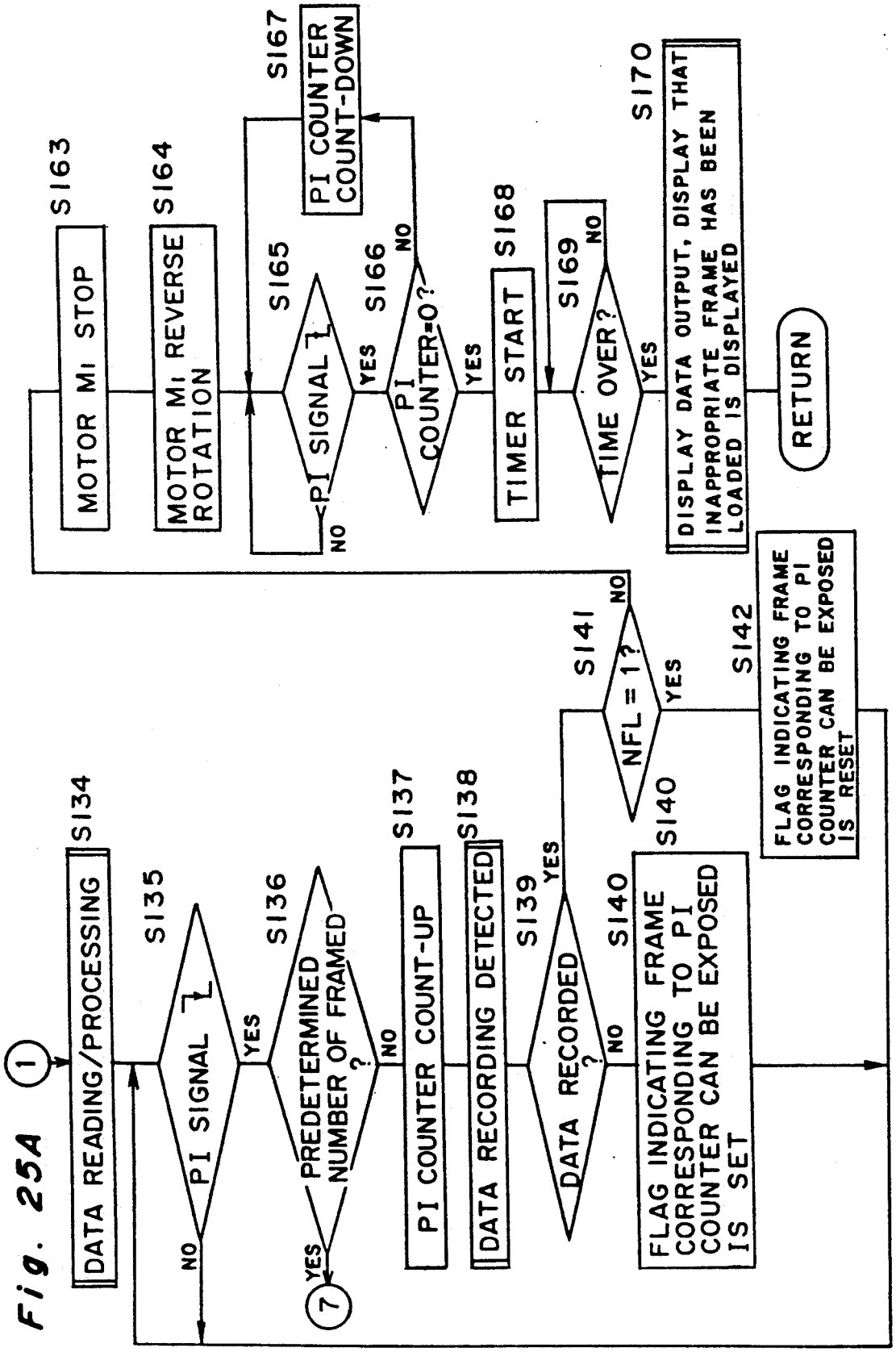

PHOTOGRAPHIC CAMERA

BACKGROUND OF THE INVENTION

1. Field of the Invention

The present invention relates to a photographic camera and more particularly, to a photographic camera capable of writing photographic information onto a film as magnetic data and reading the magnetic data therefrom.

2. Description of the Related Art

Japanese Patent Laid-Open Publication No. 60-17447 and U.S. Pat. No. 4,482,924 disclose a film having a magnetic surface formed out of magnetic material thereon so that photographic data can be written onto the film and read therefrom. A camera dealing with the photographic data by using this kind of film requires a magnetic head that is in dose contact the magnetic surface of the film, for example, a pad for pressing the film against the magnetic head is also required.

According to a conventional method for loading a film into the camera body, the leading end portion of a film is taken out for a fixed length from a patrone so that the perforations of the film positioned in the leading end portion thereof will engage the sprockets positioned on the spool side and the lid will be closed. Consequently, a user may touch the magnetic surface, which causes errors. In order to solve this problem which occurs in using this kind of film, it is preferable to provide a camera with an automatic loading mechanism which sends the film from a cartridge sending the leading end portion of the film by driving a camera, winds the film around the spool and automatically advances the film to an exposure position, only by setting the cartridge in which film is completely accommodated in the predetermined position and closing the lid.

In the camera using a film having a magnetic surface thereon, since a magnetic head is provided as above described, the leading end portion of the film may be caught by the magnetic head or the pad in sending the film from the cartridge and winding it around the spool and as a result, the automatic loading mechanism does not function normally. This is not preferable for a film and of course must be prevented. When such a loading mistake occurs, a troublesome operation such as taking out and reloading the film is needed.

Meanwhile, in order to protect certainly at least exposed frames, a pre-winding system is conventionally adopted. According to this system, in loading a cartridge, a film is taken out from a cartridge and wound around the spool before a photographing operation is performed and the film is rewound into the cartridge frame by frame after each frame is exposed. In the case that a camera and a cartridge are constructed so that the film can be re-loaded, using the pre-winding system is useful.

SUMMARY OF THE INVENTION

Accordingly, an essential object of the present invention is to provide a photographic camera using a film having a magnetic surface formed thereon in which a magnetic head or a pad does not disturb the film advance during the initial loading of the film.

Another object of the present invention is to provide a photographic camera using a film having a magnetic surface formed thereon which allows a user to promptly take out a cartridge containing a filmstrip without damaging the filmstrip when a loading mistake occurs because a magnetic head or a pad disturbs the film advance during the initial loading of the film.

Further another object of the present invention is to provide a photographic camera using a film having a magnetic surface formed thereon which can prevent a loading mistake from occurring because of a magnetic head or a pad which disturbs the film advance during the initial loading of the film.

In accomplishing the above-mentioned objects, according to the first embodiment of the present invention, a film is not held between a magnetic head and a pad until the initial loading of the film is normally completed and is held between the magnetic head and the pad after the normal completion of the initial loading is detected.

Further, according to the second embodiment of the present invention, a film is not held between a magnetic head and a pad until the initial loading of the film is normally completed and when the initial loading of the film is not normally performed, the entire filmstrip is rewound into a film cartridge so that the film cartridge can be easily taken out from a camera body.

According to the third embodiment of the present invention, a film is not held between a magnetic head and a pad until the initial loading of the film is normally completed and the film is held between the magnetic head and the pad and a pre-winding operation is performed after the normal completion of the initial loading is detected.

BRIEF DESCRIPTION OF THE DRAWINGS

The above-mentioned objects and features of the present invention will become apparent from the following description taken in conjunction with the preferred embodiments thereof with reference to the accompanying drawings, in which.

DETAILED DESCRIPTION OF THE EMBODIMENTS

Figure 1:
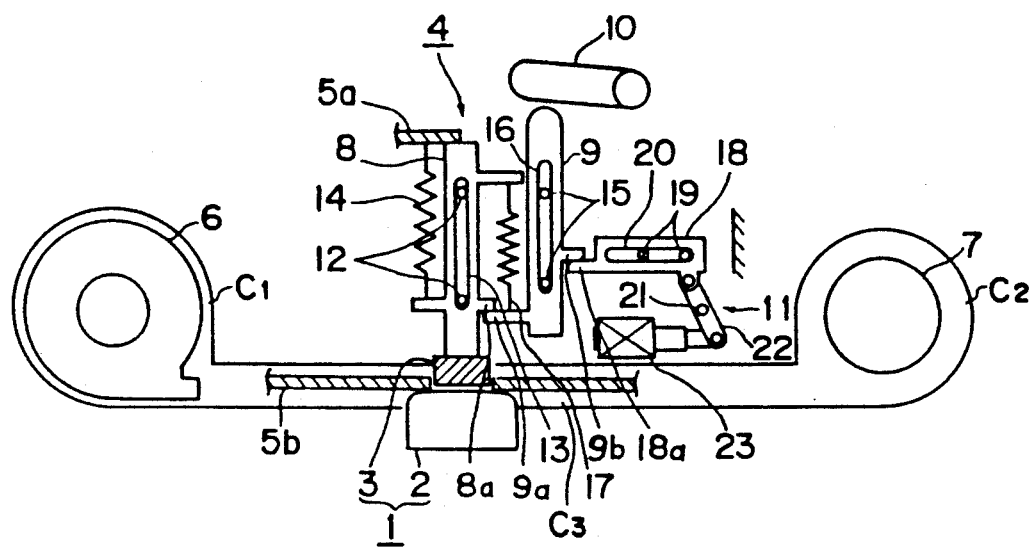
FIG. 1 is a schematic view showing the structure of the magnetic head section and driving mechanism in an automatic loading type camera provided in the present invention.

Before the description of the present invention proceeds, it is to be noted that like parts are designated by like reference numerals throughout the accompanying drawings.

Referring to FIG. 1 through 27, an embodiment of an automatic loading camera having a magnetic head in accordance the present invention is described in detail below. As described later in detail, the camera uses a cartridge that is set into a predetermined position in the camera body. The cartridge accommodates a film inside and sends the film according to driving of the camera so that the film should be wound around a spool.

As shown in FIG. 1, in order to write photographic information onto the film having the magnetic surface formed out of magnetic material and read the photographic information therefrom, the camera includes a magnetic head portion 1 comprising the magnetic head 2 fixed to the camera body and the pad 3 which is driven by the driving mechanism 4 to move between a position at which the pad 3 is pressed against the magnetic head 2 and a position spaced a short distance from the above-mentioned position. The magnetic head portion 1 writes photographic information onto the film surface and reads information therefrom when the film is in the data processing position at which the pad 3 is pressed against the magnetic head 2 and is held between the magnetic head 2 and the pad 3. In another case, the magnetic head portion 1 is set in the move-away position at which the film is capable of moving between the pad 3 and the magnetic head 2 by positioning the pad 3 away from the magnetic head 2. The magnetic head portion 1 is provided at the predetermined position in the exposing chamber $C_3$ between the film cartridge 6 in the film loading chamber $C_1$ and the spool 7, in the film winding chamber $C_2$, around which the film is wound.

The driving mechanism 4 for setting the magnetic head portion 1 at the data processing position or the move-away position by moving respectively the pad 3 between the above-mentioned positions comprises the first rod 8 to which one end the pad 3 is fixed and which is movable in a direction perpendicular to the film surface, the second rod 9 for moving the first rod 8 so as to set the position of the first rod 8, the driving lever 10 which swings to move the second rod 9, and the stopper 11 for regulating the movement of the second rod 9 against the force of the lever 10.

The first rod 8 has the slot 13 into which the two fixed pins 12 mounted on the camera body are fitted. The slot 13 regulates the moving direction of the first rod 8. The difference between the distance between the pins 12 and the length of the slot 13 is equal to the movement distance of the first rod 8. The tension spring 14 provided between the first rod 8 and the camera body 5a sets regularly the pad 3 at the position away from the magnetic head 2. The second rod 9 has the slot 16 into which the two fixed pins 15 are fitted. Thus, the movement direction and the movement distance of the second rod 9 are regulated. The second rod 9 is connected with the first rod 8 through the tension spring 17 by bringing the claw 8a of the first rod 8 and the claw 9a of the second rod 9 into contact so that the second rod 9 should regulate the relative positioning relation to the first rod 8 in one direction. In order to move the second rod 9 toward the magnetic head 2 along the slot 16, the driving lever 10 is driven by the motor 24 (shown in FIG. 2), a driving source, through a friction transmission mechanism. The stopper 11 comprises the third rod 18, the lever 22 and the plunger 23. The third rod 18 has the claw 18a which engages the claw 9b of the second rod 9 for regulating the movement of the second rod 9. The third rod 18 has also the slot 20 into which the two fixed pins 19 are fitted so as to regulate the movement direction and the movement distance of the third rod 18. Thus, the claw 9b engages the claw 18a or disengage therefrom. The third rod 18 is connected with the plunger 23 through the lever 22 which swings about the supporting pin 21.

The camera adopts pre-winding system in which the film contained in the cartridge 6 is wound around the spool in the film winding chamber $C_2$ first and then exposed frames are rewound back into the cartridge 6 frame by frame. The pre-winding and rewinding operations and the operation by the driving mechanism 4 are performed by the same motor.

The structure of the driving system concerning to the pre-winding and rewinding operations including the motor is described below with FIG. 2.

Figure 2:
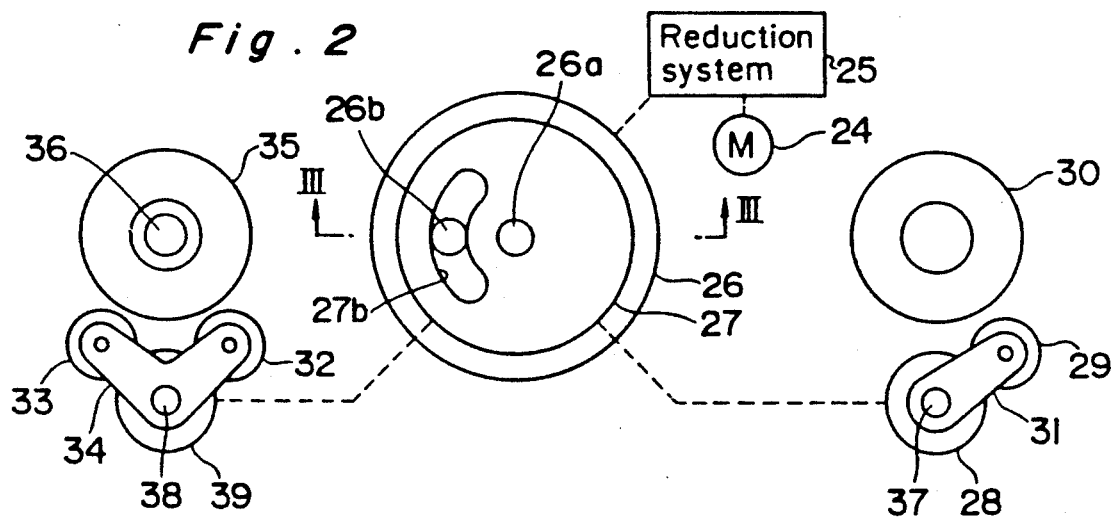
FIG. 2 is a schematic view showing the structure of the driving system for pre-winding and winding a film.
Figure 3:
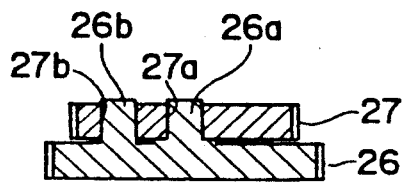
FIG. 3 is a sectional view taken along the line III—III of FIG. 2.

In FIG. 2, the motor 24 serving as the driving source for performing the above-described operations is connected with the input gear 26 through the reduction system 25. (for simplifying, about the all gears only the diameter of a pitch circle is shown by a solid line.) the output gear 27 concentric with the input gear 26 is mounted on the input gear 26. As shown in FIG. 3 which is a sectional view taken along the line III—III of FIG. 2, the input gear 26 has the projections 26a and 26b in the center and the eccentric position, respectively. The output gear 27 has the opening 27a into which the projection 26a is inserted and the circular groove 27b coinciding with the locus of the projection 26b according to the rotation of the input gear 26.

The rotation of the output gear 27 is transmitted through a gear train not shown (shown by broken lines) to the input gear 28 for driving the spool in the film winding chamber $C_2$ and to the input gear 39 for driving the fork 36 in a film loading chamber $C_1$, which operates a film (a cartridge accommodating chamber). The planetary carrier 31 supporting the planetary gear 29 revolving around the sun gear namely, the gear 28 is rotatably mounted on the shaft 37 supporting the sun gear 28. According to the rotation of the sun gear 28, the planetary gear 29 engages the spool gear 30 or disengages therefrom so that the spool 7 in the film winding chamber $C_2$ can be determined to be driven or not driven. The L-shaped planetary carrier 34 supporting the planetary gears 32 and 33 revolving around the sun gear, namely, the gear 39 is rotatably mounted on the shaft 38 supporting the sun gear 39. According to the rotation of the sun gear 39, the planetary gears 32 and 33 engage the fork gear 35 or disengage therefrom so that the fork 36 in the film loading chamber $C_1$ can be determined to be driven or not driven and the rotational direction of the fork 36 which is driven can be determined.

Figure 28:
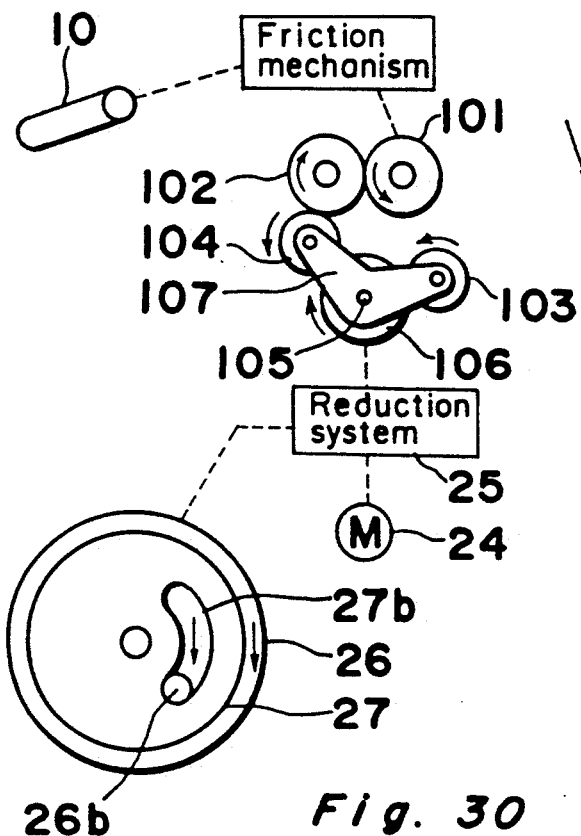
FIGS. 28 through 30 are illustrations of the operation of the driving lever.
Figure 29:
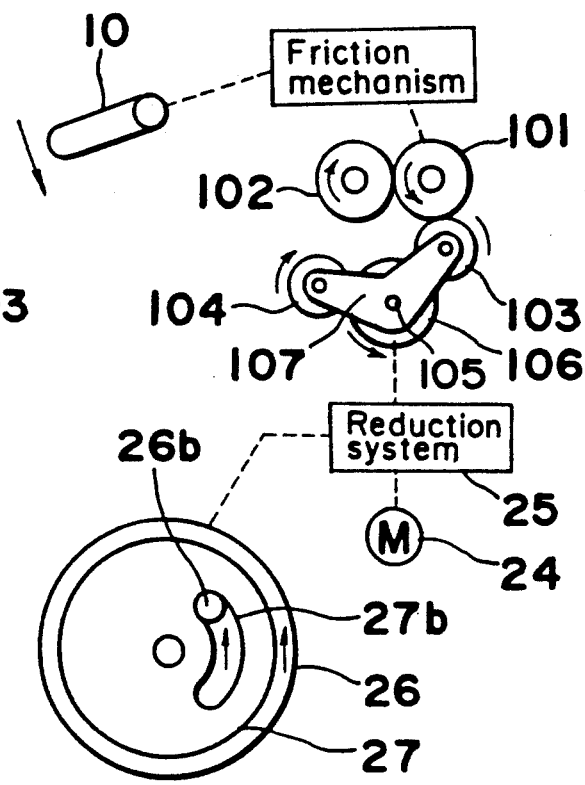
Figure 30:
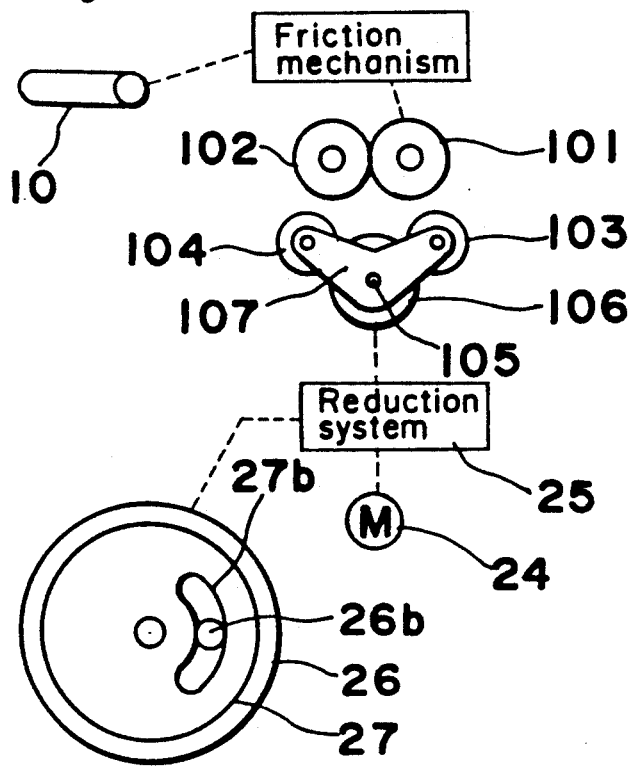

FIG. 28 through 30 show the operation of the lever 10. The motor 24 drives the sun gear 106 through the reduction system 25. the L-shaped planetary carrier 107 supporting the planetary gears 103 and 104 revolving around the sun gear, namely, the gear 106 is rotatably mounted on the shaft 105 supporting the sun gear 106. According to the rotation of the gear 106, the planetary gears 103 and 104 engage the gears 101 and 102 or disengage therefrom so that the gear 101 or the gear 102 can be selected.

FIG. 28 shows the driving mechanism operated to pre-wind a film. The motor 24 rotates the sun gear 106 in the direction shown by the arrow (namely, clockwise) through the reduction system 25. According to the rotation of the sun gear 106, the gear 102 and the gear 101 are rotated clockwise and counterclockwise respectively, through the planetary gear 104. The lever 10 is connected with the gear 101 through the friction mechanism. Therefore, with the rotation of the gear 101, the lever 10 swings and the second rod 9 is pressed toward the magnetic head 2.

FIG. 29 shows the driving mechanism operated to re-wind the film back to the cartridge. The rotational direction of the motor 24 is opposite to that in the pre-winding operation. Therefore, according to the counterclockwise rotation of the gear 106, the gear 101 is rotated counterclockwise through the planetary gear 103. Thus, the lever 10 swings and the second rod 9 is pressed toward the magnetic head 2.

Figure 12:
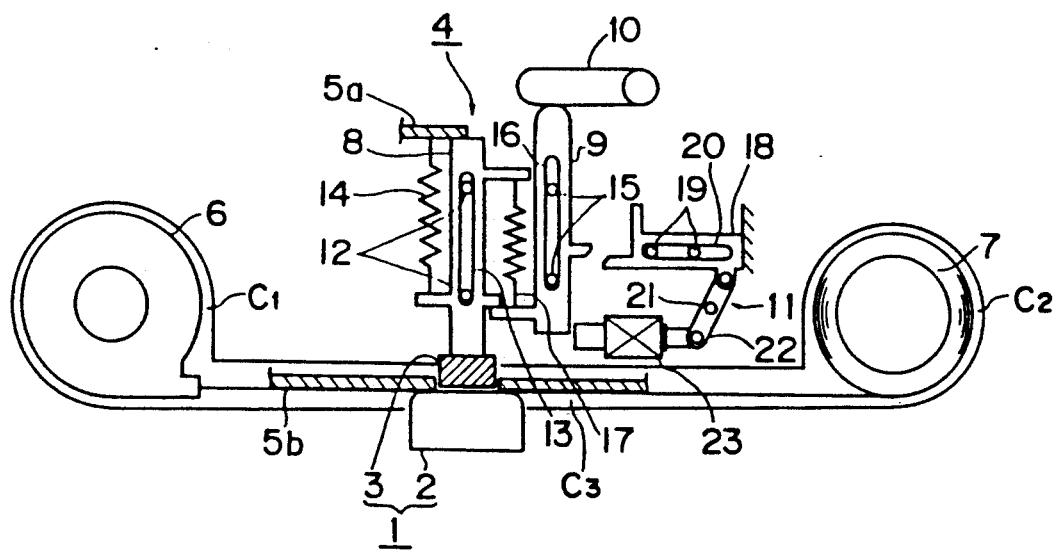
Figure 13:
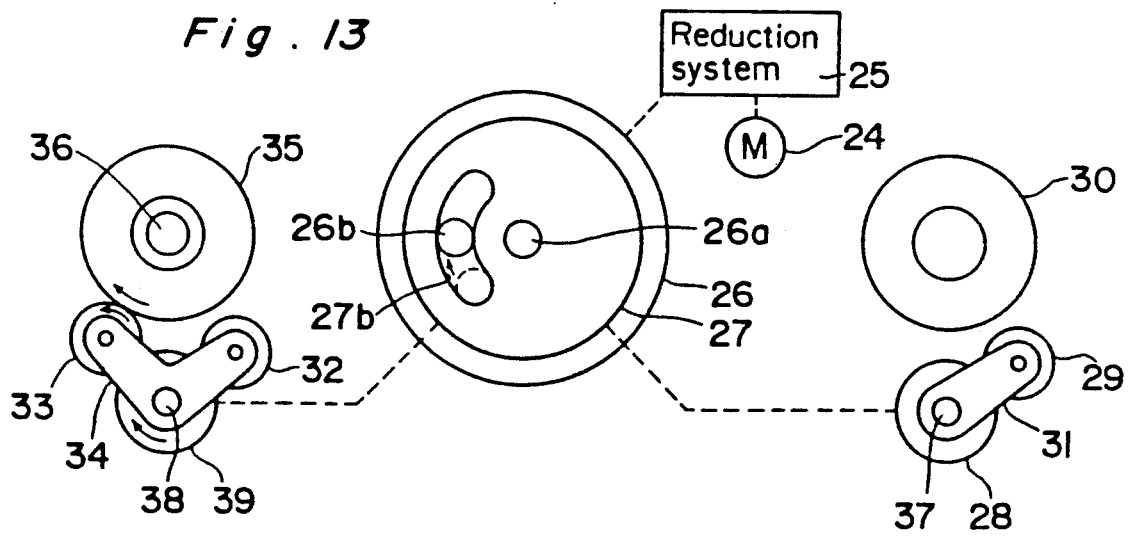

FIG. 30 shows the driving mechanism which has completed the rewinding of a frame back into the film loading chamber. When the winding of the frame is completed in the condition shown in FIG. 29, the motor 24 stops. Then, the motor 24 is rotated forward (pre-winding direction) again. The gear 106 rotates clockwise, and consequently, the planetary carrier 107 rotates clockwise as well. As a result, the gear 102 disengages from the gear 103 and the lever 10 is disconnected from the gear 101. Therefore, the lever 10 loses the driving force and the second rod 9 returns to the original position and the magnetic head portion 1 is placed in the move-away position as shown in FIGS. 12 and 13. This operation is performed not by the rotation of the output gear 27 but by the rotation of the motor within the range where the projection 26b of the input gear 26 slides in the groove 27b. Accordingly, the output gear 27 connected with the film sending feeding mechanism does not rotate, so that the film is not sent.

FIG. 4 through FIG. 17 show the pre-winding condition and rewinding condition of a film. Before these operations are described by the flowcharts shown in FIG. 23 through FIG. 27, the structure of the electric circuit in the camera is described with reference to the block diagram shown in FIG. 18.

The electric circuit comprises the microcomputer CP for controlling the operation of the camera; the flash control section FLS for controlling the flashlight operation of the flashlight device through the microcomputer CP; the light measuring section LM and the distance measuring section AF for measuring the light amount and the distance respectively according to an instruction issued by the microcomputer CP and feeding measured data back to the microcomputer CP; and the display control section DS for controlling the display of data in the display window of the camera body.

The electric circuit further comprises the switches $S_0$ through $S_9$. The operation of the camera is determined according to ON or OFF of these switches. When the main switch $S_0$ is ON, the operation of the camera is performed. When the light-measuring switch $S_1$ is turned on, a light measuring operation is performed.

When the release switch $S_2$ is turned on, a shutter release is carried out. A zooming operation is electrically performed in the camera. When the zoom switch button provided on the camera body is operated to the wide angle side, the zoom-out switch $S_3$ is turned on and the view finder is switched from the telescopic side to the wide angle side. When the zoom switch button is operated to the telescopic side, the zoom-in switch $S_4$ is turned on and the finder is switched from the wide angle side to the telescopic side. In order to change the photographic range according to the operation of the finder, the photographing lens is also zoomed or trimming information for limiting the printing range is written onto the film so as to correspond to a varying photographing range without zooming the photographing lens. The cartridge lid switch $S_5$ is turned on when the lid of the camera for inserting the cartridge into the camera body is closed. The film wind detecting switch $S_6$ is turned on when it receives a signal from a detecting mean for detecting that the film is wound around the spool. The magnetic head position detecting switch $S_7$ is turned off when the magnetic head section 1 is placed in the data processing position. The flash switch $S_8$ controls ON and OFF of the flashlight device corresponding to on and off of itself, respectively. The film exposing detecting switch $S_9$ detects whether a film has been exposed or not, i.e., it is turned off when a loaded film has not been exposed and turned on when the loaded film has been exposed.

Figure 19:
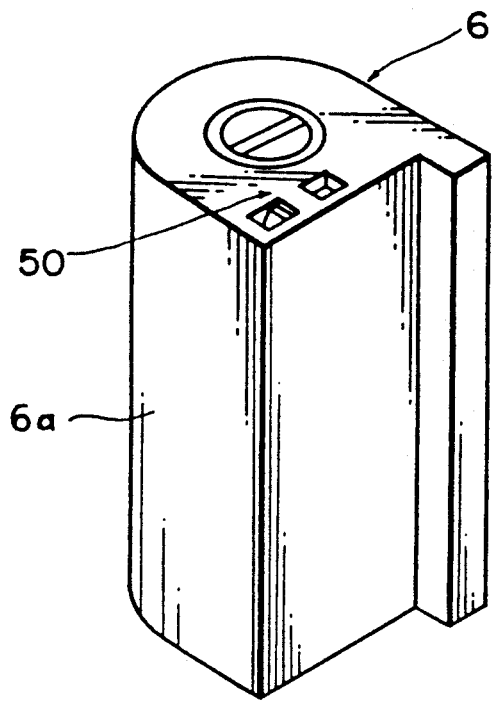
FIG. 19 is a view showing the external appearance of the cartridge to be used in the camera.
Figure 20:
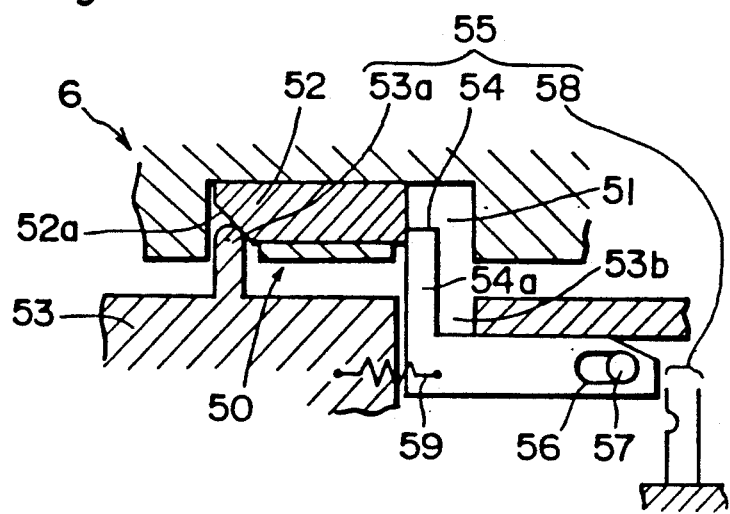
FIGS. 20 through 22 are fragmentary sectional views showing the structure and operating condition of the detecting portion for detecting the use/nonuse of a film.
Figure 21:
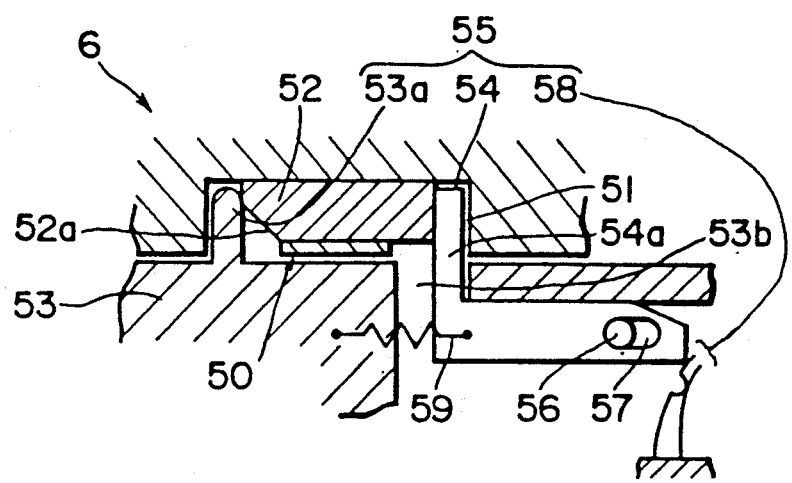
Figure 22:
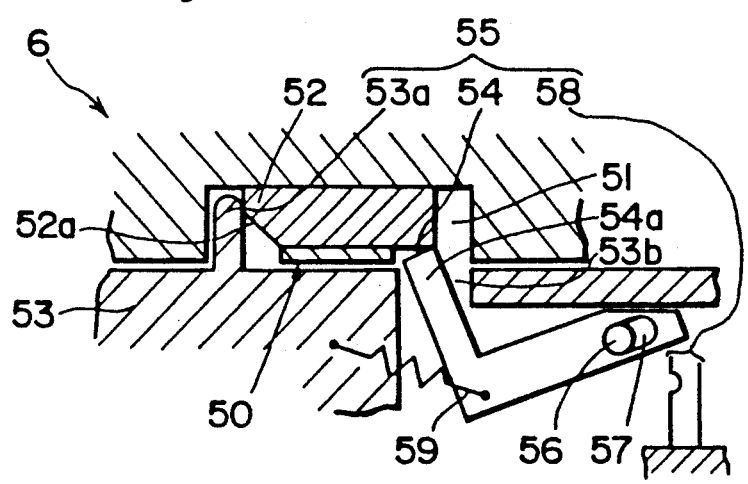

The structure for detecting whether or not a film has been exposed based on ON and OFF of the switch $S_9$ is described together with the film cartridge 6 used for the camera. The external appearance of the cartridge 6 to be used for the camera is as shown in FIG. 19. The film condition display means 50 for displaying whether or not the film has been exposed is provided on one end surface of the casing 6a. A photographer can distinguish at a glance whether or not the film has been exposed according to the display made by the display means 50. By a decision made by the microcomputer CP whether the film has been exposed or not, an operation corresponding to the condition is performed. As shown in FIGS. 20 through 22 showing the cartridge 6 inserted into the camera body, the display means 50 comprises the concavity 51 and a slide member 52 movable laterally in the concavity 51. Whether or not the film has been exposed is decided by the position of the slide member 52. The detecting means 55 provided on the camera body for detecting the position of the slide member 52 comprises the film exposing detecting switch 58 (shown as the switch $S_9$ in FIG. 18), the projection 53a provided on the camera body to be inserted into the concave 51 when the cartridge 6 is loaded into the camera body, the L-shaped detecting lever 54 mounted on the camera body 53 with a detection strip 54a projecting from the through-hole 53b toward the cartridge 6. The detecting lever 54 is mounted on the camera body 53 with the fixed pin 57 inserted into the slot 56 and urged along the slot 56 by the tension spring 59. The switch 58 is positioned in just vicinity of the lever 54.

FIG. 20 shows a condition just before the unused cartridge is inserted into the camera body 53. In this case, since the slide member 52 is on the side of the projection 53a on the camera body, as shown in FIG. 20, the projection 53a contacts the tapered face 52a of the slide member 52 and the detection strip 54a of the detecting lever 54 is inserted into the concavity 51.

Accordingly, as shown in FIG. 21, when the cartridge 6 is inserted furthermore into the camera body 53, the projection 53a drives the slide member 52 toward the detecting lever 54 and the detecting lever 54 is pressed against the detecting switch 58, so that the detecting switch 58 is turned on. FIG. 22 shows a cartridge in which some frames or all frames of the film having been exposed, inserted into the camera body 53. In this case, the slide member 52 is on the side of the detecting lever 54. Therefore, when the cartridge 6 is inserted into the camera body 53, the slide member 52 contacts the top of the strip 54a and inclines the detecting lever 54. Thus, the detecting switch 58 is not operated, namely, is kept OFF. As described above, when the film which has not been exposed is loaded into the camera body 53, the display means 50 operates the detecting means 55 and the condition of the display means 50 also changes, while when some or all frames of the film which have been exposed is loaded into the camera body 53, the display means 50 does not operate the detecting means 55 and the condition of the display means 50 does not change, either.

Figure 18:
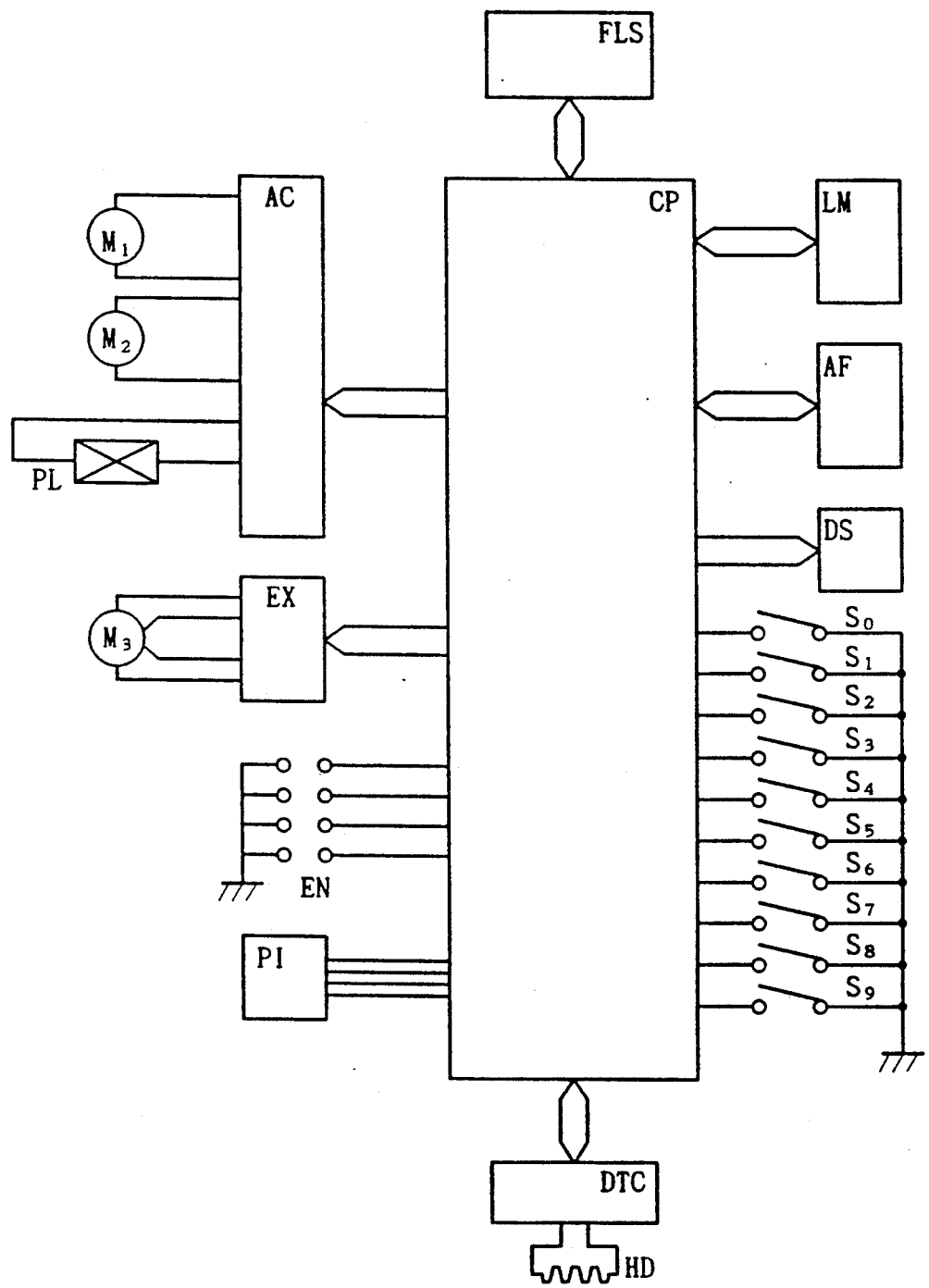
FIG. 18 is a block diagram showing the electric circuit of the camera provided in the present invention.

Referring to FIG. 18, the electric circuit further comprises the data control section DTC connected with the magnetic head HD so as to process the photographing data of the film.

The actuator driving section AC controls the first motor $M_1$ (denoted by 24 in FIG. 24) for pre-winding and rewinding the film and driving the magnetic head section 1, the second motor $M_2$ for operating the finder between the wide angle side and the telescopic side, and the plunger PL (denoted by 23 in FIG. 1) for regulating the position of the pad 3. Upon application of a positive pulse voltage on the plunger PL, the claw 9b of the second rod 9 disengages from the claw 18a of the third rod 18. As a result, the pad 3 is capable of moving toward the magnetic head 2. Upon application of a negative pulse voltage on the plunger PL, the claw 9b engages the claw 18a. As a result, the pad 3 is prevented from moving toward the magnetic head 2. Referring to FIG. 18, the electric circuit further comprises the exposure control section EX which controls the third motor $M_3$ for driving the photographing lens for a focusing operation and the shutter; the zoom encoder EN for detecting the zoom position in the finder; and the photointerrupter PI for detecting each frame of the film whether or not the film is send.

The operation of the camera of the above structure is described with reference to flowcharts shown in FIGS. 23 through 27 and operation condition views shown in FIGS. 4 through 17.

Figure 23:
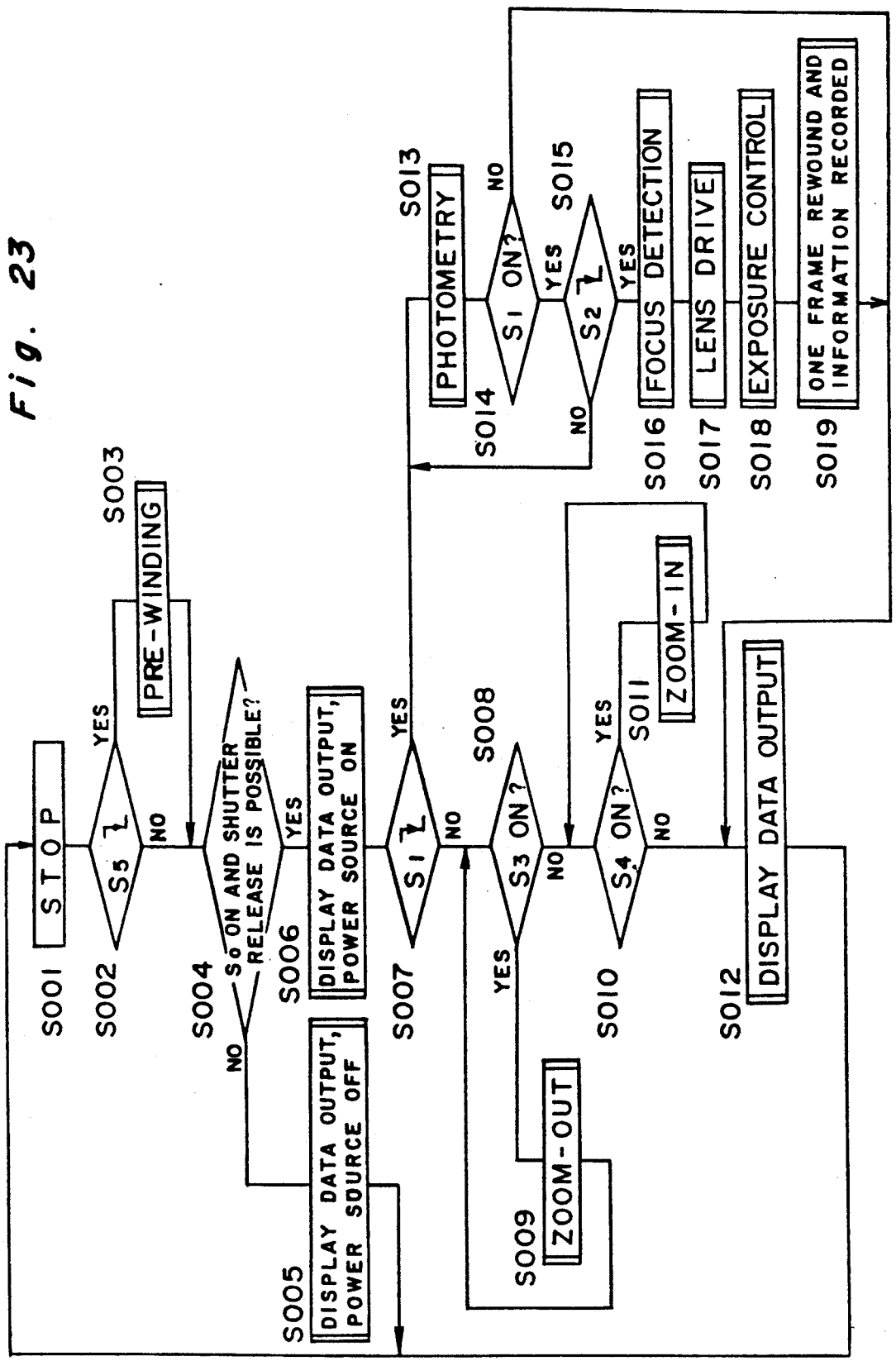
FIGS. 23 through 27B are flowcharts showing the operation of the camera.

FIG. 23 shows the main routine of the entire operation of the camera. At step S001, the microcomputer waits for a data input. If any operation is carried out in this condition, it is detected at step S002 whether or not the switch $S_5$ is turned on, i.e., whether or not the cartridge lid is closed. If it is decided that the switch $S_5$ is turned on as a result of the closing of the cartridge lid, the film is pre-wound at step S003 according to the subroutine of pre-winding operation shown in FIGS. 24 through 26. After the film is pre-wound and If the switch $S_5$ is not turned on, it is decided at step S004 whether or not the main switch $S_0$ is ON and the shutter release can be performed. If it is decided that the main switch $S_0$ is OFF or the release prohibition flag is set, after OFF of the main power source is displayed at step S005, the program returns to step S001 at which a data input is waited.

If it is decided at step S004 that the main switch $S_0$ is ON and the shutter release can be carried out, ON of the main power source is displayed at step S006. Then, it is decided whether or not the light-measuring switch $S_1$ is turned on (at step S007). If no, it is decided at step S008 whether or not the zoom-out switch $S_3$ is ON. If yes, the subroutine of the zoom-out is executed to carry out the zoom-out of the finder at step S009. If the switch $S_3$ is OFF, it is decided at step S010 whether or not the zoom-in switch $S_4$ is ON. If yes, the subroutine of the zoom-in is executed to carry out the zoom-in of the finder at step S011. If the switches $S_3$ and $S_4$ are OFF, after data of the decision is displayed at step S012 the program returns to step S001 at which a data input is waited.

If it is decided at step S007 that the light-measuring switch $S_1$ is turned on, the subroutine for performing a light measuring is executed at step S013. It is decided at step S014 whether the light-measuring switch $S_1$ is still ON after the light measuring is performed. If the switch $S_1$ is turned off, the program returns through step S012 to step S001 at which a data input is waited. If it is decided at step S014 that the release switch $S_1$ is still ON, it is decided at step S015 whether or not the switch $S_2$ is turned on. If no, the program goes from step S015 to step S013 repeatedly. If yes, the focus detecting routine is executed at step S016 to perform a focusing operation reliably immediately before the shutter is released. Then, at step S017, the photographing lens is moved for focusing according to the focus position detected by the third motor $M_3$ and at step S018, the shutter is driven to perform an exposure control. After the exposure control is finished at step S019, one frame of the film is wound and photographing information is recorded onto the film according to the subroutine shown in FIG. 27. Then, the program returns through step S012 to step S001 at which a data input is waited.

Figure 24A:
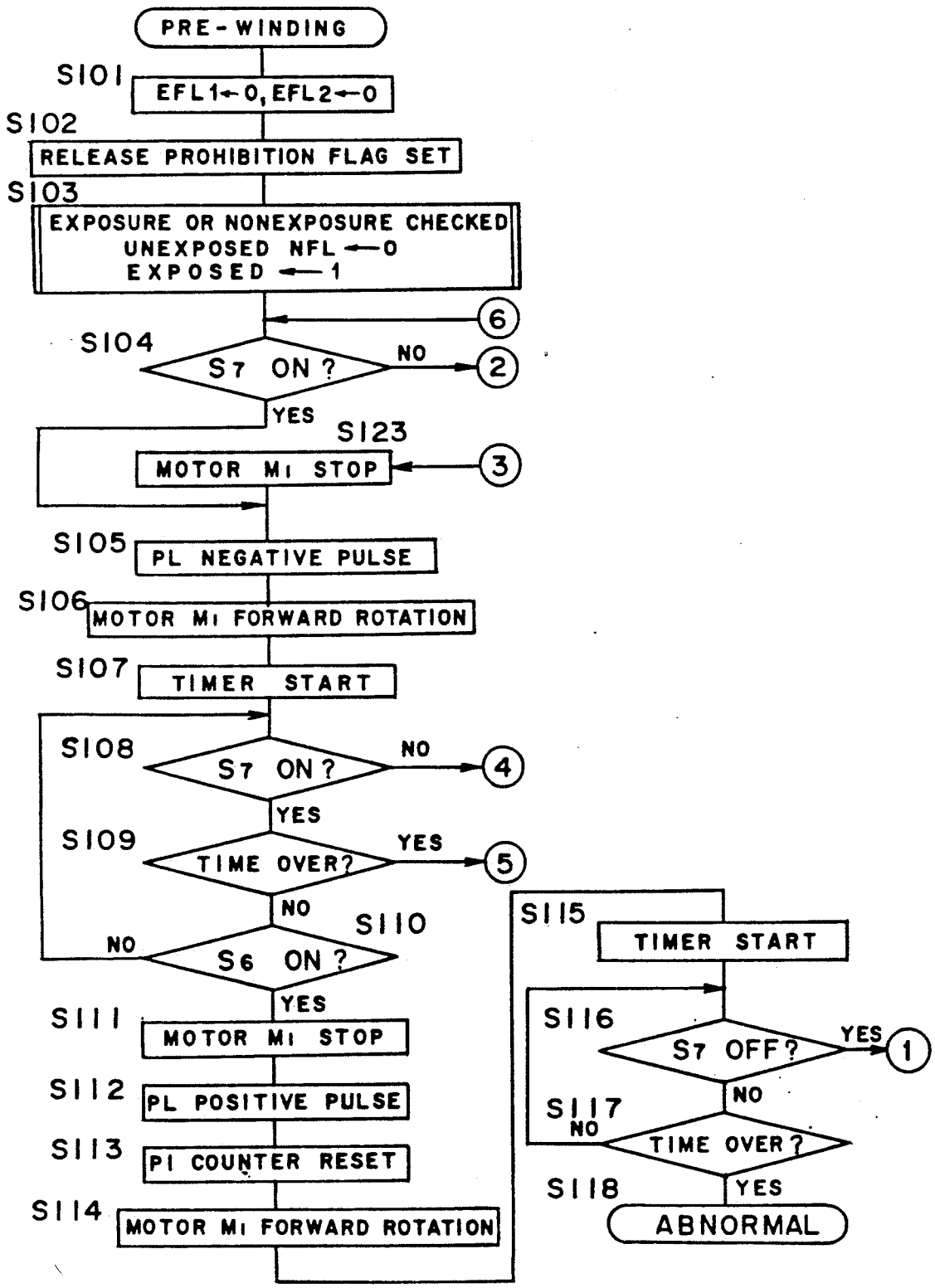
Figure 24B:
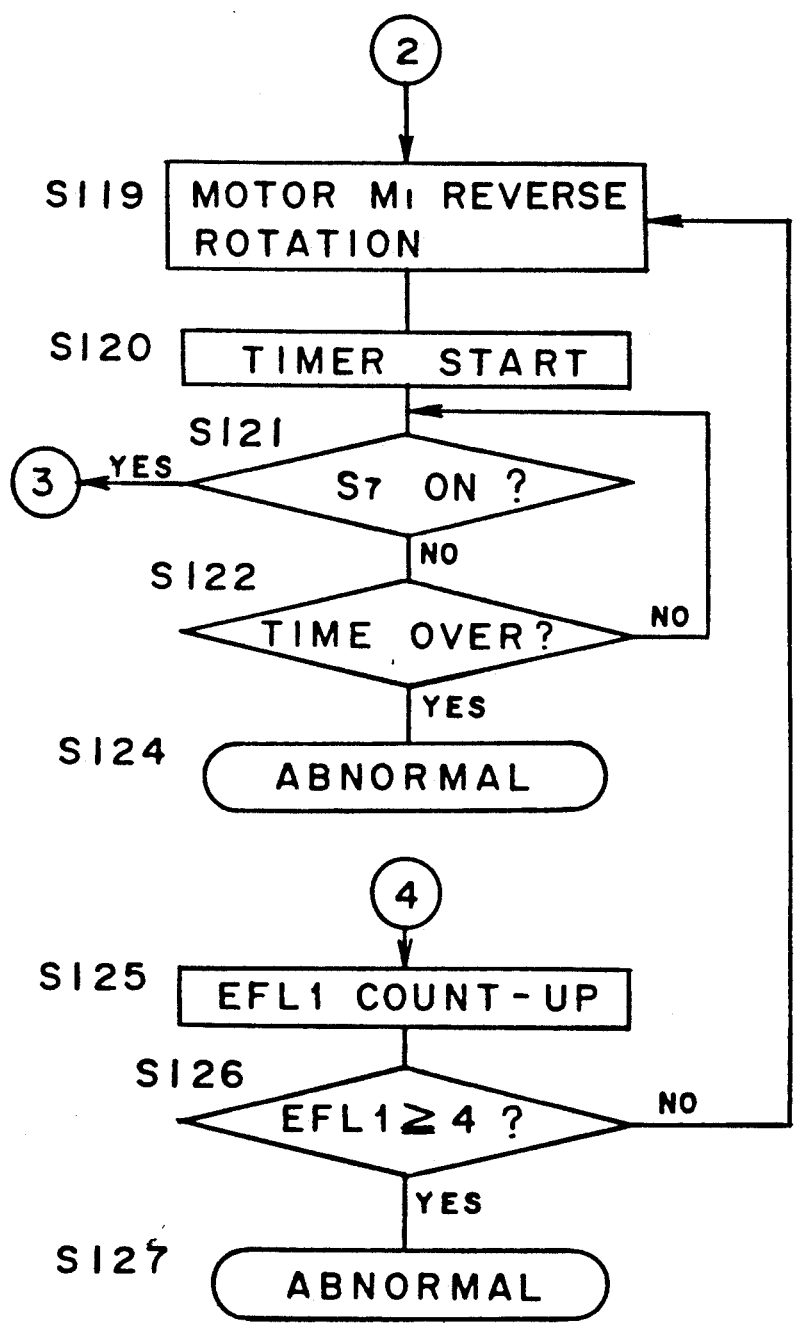
Figure 24C:
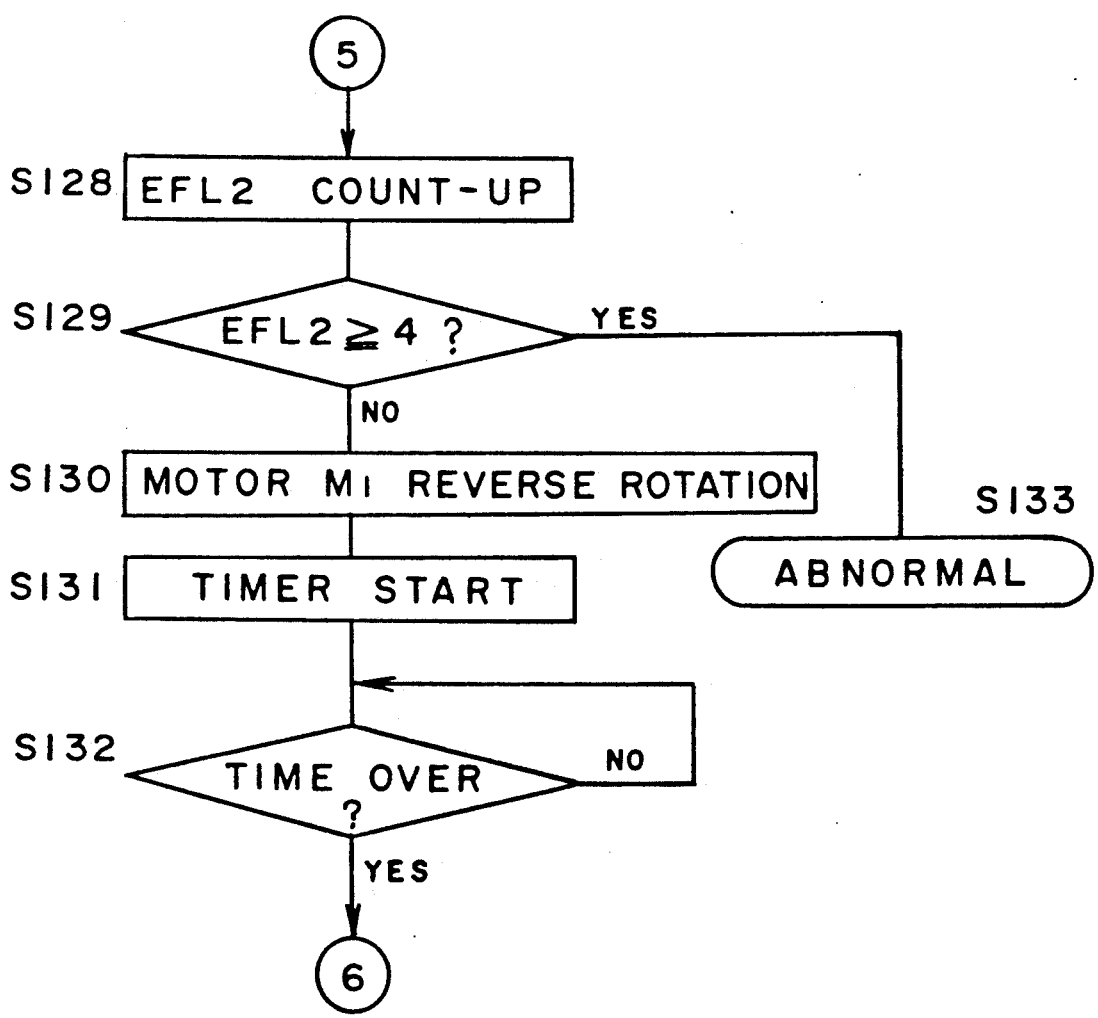

The pre-winding operation of the film shown at step S003 in the main routine is described with reference to the flowcharts shown in FIGS. 24 through 26 and operation condition views shown in FIGS. 1 through 13.

When the pre-winding routine is executed, the error counters EFL1 and EFL2 are reset to "0" to count the number of errors in the automatic loading of the film at step S101. In order to prohibit a photographing operation during the pre-winding operation, the release prohibition flag is set at step S102. Then, it is decided at step S103 whether or not the film loaded into the film loading chamber has been exposed and in addition, for distinguish whether or not the film has been exposed, the flag NFL is reset to "0" if the film has not been exposed and set to "1" if the film has been exposed. It is not clear at this stage whether the film is re-loaded after it has been all exposed or partly exposed even though the film is detected to have been exposed and the flag NFL is set to "1".

After the above operations terminate, it is decided at step S104 whether or not the switch $S_7$ is ON to discriminate whether the magnetic head section 1 is in the data processing position or the move-away position. If yes, i.e., if it is decided that the magnetic head section is in the move-away position, a negative pulse voltage is applied to the plunger PL so as to prohibit the pad 3 from moving toward the magnetic head 2 at step S105. FIG. 1 shows the magnetic head section 1 and the driving mechanism 4 in this condition.

Figure 4:
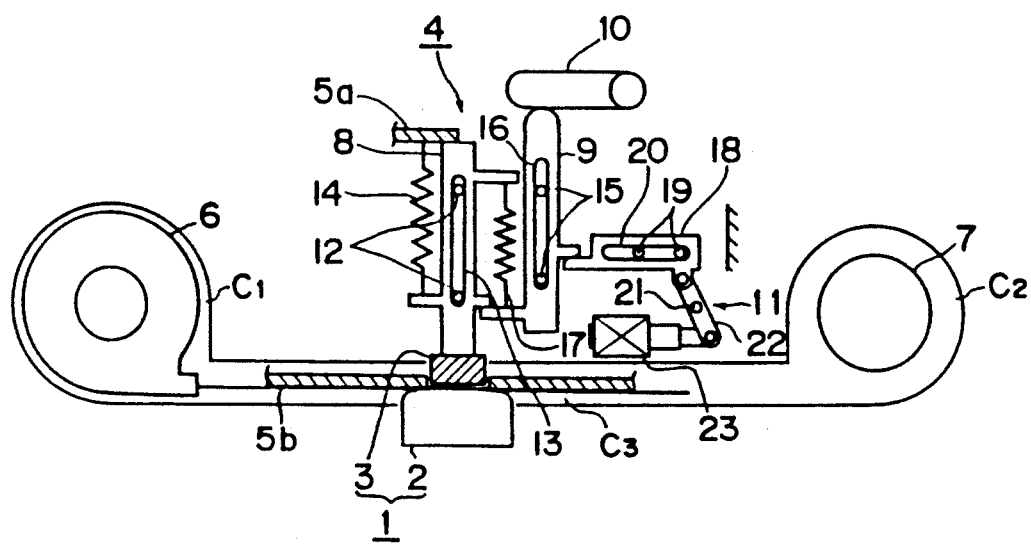
FIG. 4 through FIG. 17 are views showing operating condition of the driving mechanism or the driving system shown in FIG. 1 or FIG. 2.
Figure 5:
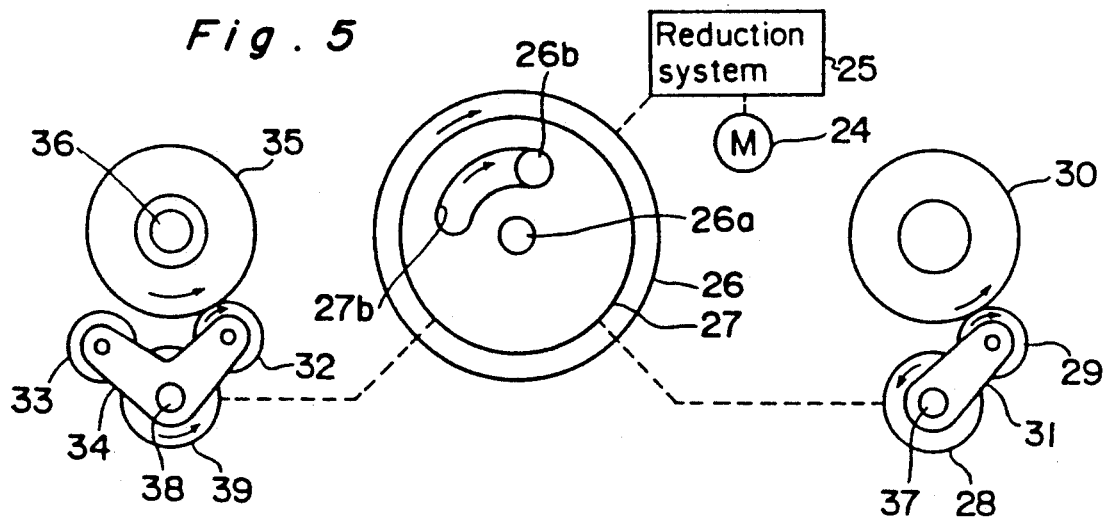

At step S106, the first motor $M_1$ starts rotating forward with the movement of the pad 3 toward the magnetic head 2 prohibited. As shown in FIGS. 4 and 5, the lever 10 swings by the rotation of the motor 24 (the first motor $M_1$), presses the second rod 9 toward the magnetic head 2. But the claw 9b engages the claw 18a, so that a slip occurs in the friction transmission mechanism. Consequently, the second rod 9 is prevented from moving, namely, the magnetic head section 1 is kept in the move-away position. The rotation of the motor 24 is transmitted to the each input gear 28 and 39. According to the rotation of the spool gear 30 and the fork gear 35 rotate through the planetary gears 29 and 32, respectively. Thus, the spool 7 and the fork 36 are driven. With the rotation of the fork 36, the film is gradually pressed out from the cartridge 6, passes between the magnetic head 2 and the pad 3 and proceeds toward the spool in the film winding chamber as shown in FIG. 4.

Figure 6:
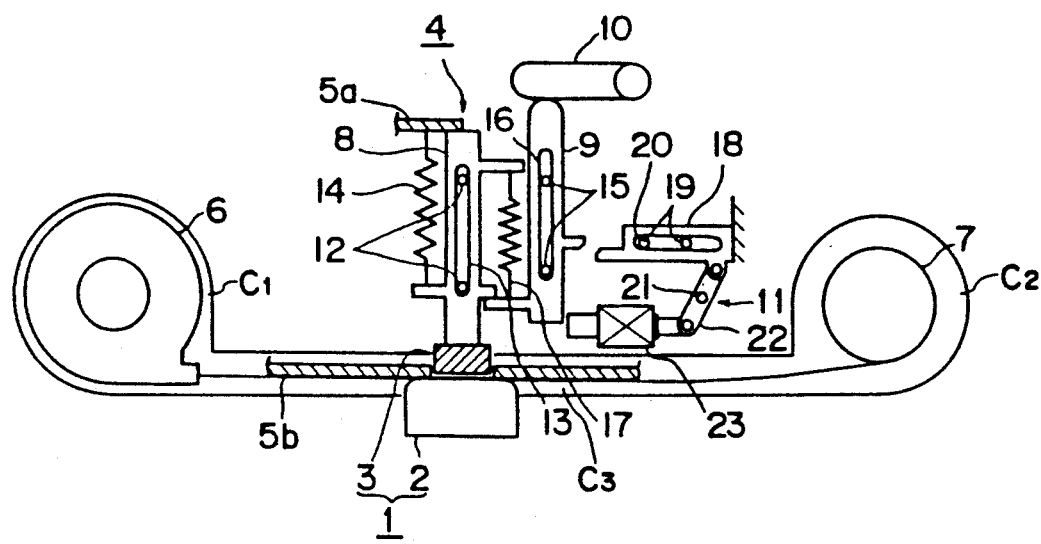
Figure 7:
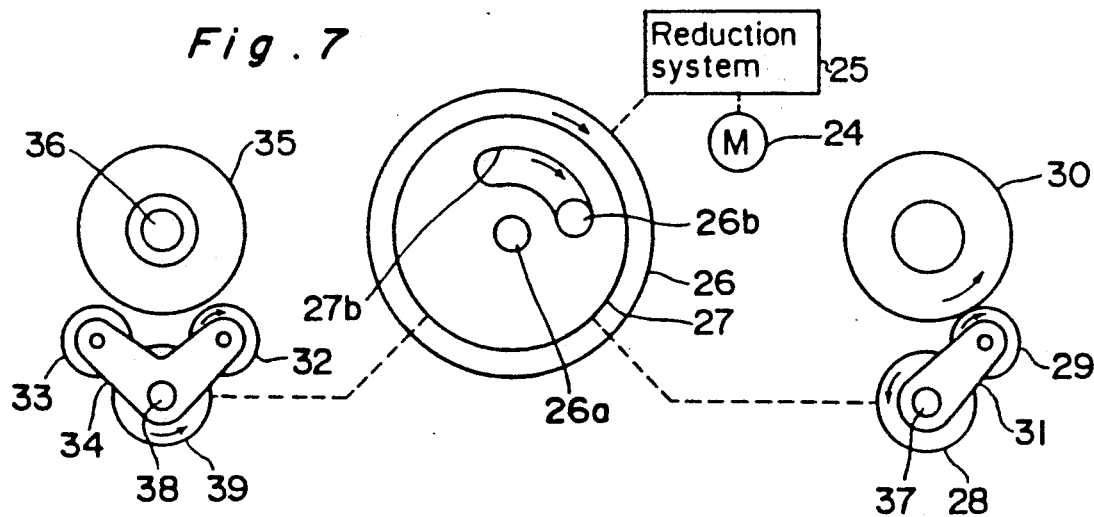
Figure 8:
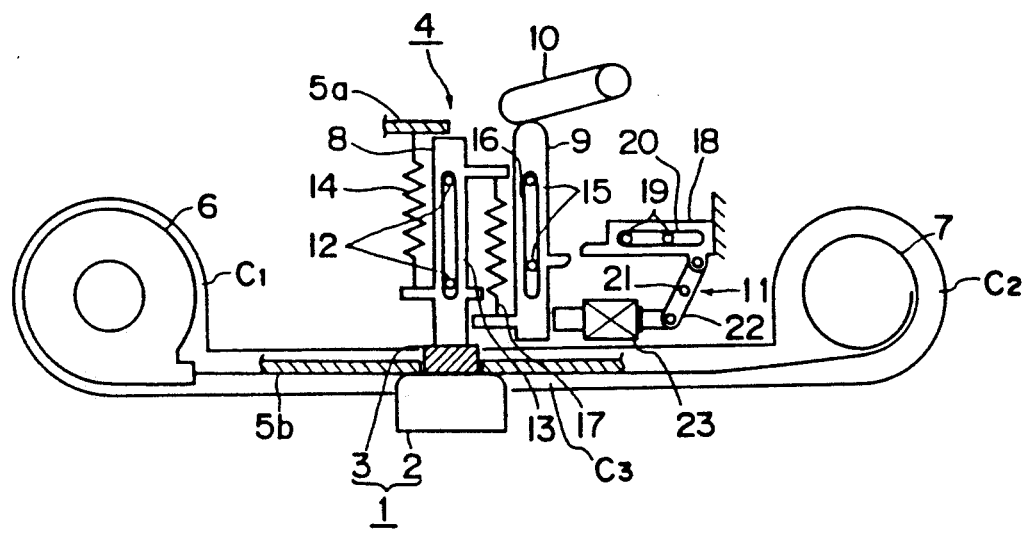
Figure 9:
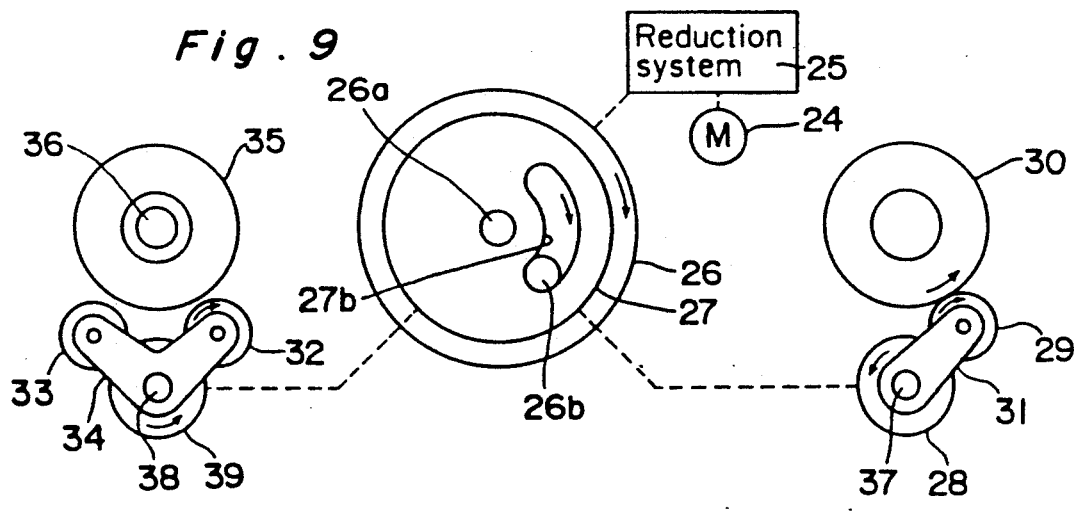

At step S107, a timer starts to detect whether or not a loading mistake occurs in a predetermined period of time. It is decided at step S108 whether or not the switch $S_7$ is ON to discriminate whether the magnetic head section 1 is still in the move-away position, and further, it is decided at steps S109 and S110 whether or not the switch $S_6$ is turned on in the predetermined period of time, namely, whether or not the film is wound around the spool 7. If it is decided that the film is wound around the spool 7, the first motor $M_1$ stops at step S111. A positive pulse voltage is applied to the plunger PL at step S112, so that the third rod 18 disengages from the second rod 9. Then, at step S113, the PI counter operatively connected with the photointerrupter PI is reset to "0". At step S114, the first motor $M_1$ starts rotating forward again as shown in FIGS. 6 and 7. At this time, the lever 10 operated by the rotation of the first motor $M_1$ presses the second rod 9 toward the magnetic head 2 because the third rod 18 has disengaged from the second rod 9. As a result, according to the tension springs 14 and 17, the pad 3 is pressed against the magnetic head 2 by a predetermined strength, and the magnetic head section 1 moves in the data processing position as shown in FIGS. 8 and 9. The spool 7 is driven by the gear train so that the peripheral speed of the spool 7 can be faster than that of the fork 36. After the film is wound around the spool 7, the planetary gear 32 disengages from the fork gear 35 as shown in FIGS. 7 and 9. In order to check whether or not the magnetic head section 1 is set in the data processing position in the predetermined period of time by the forward rotation of the first motor $M_1$, it is decided at steps S115, S116 and S117 whether or not the switch $S_7$ is turned off in a predetermined period of time set by the timer. If yes, the setting of the magnetic head 1 at the data processing position is completed in the pre-winding operation. If no, the operation of the camera stops at step S118 because an abnormality has occurred.

As described above, the magnetic head section 1 is set in the move-away position so that the film should proceed to the film winding chamber when the film is sent out from the cartridge 6. After the film has been wound around the spool 7, the magnetic head section 1 is set in the data processing position. Accordingly, the leading end portion of the film is not caught by the magnetic head 2 or the pad 3 of the magnetic head section 1 in sending the film, and the loading mistake of the film is prevented effectively.

If it is decided at step S104 that the magnetic head 1 is in the data processing position after the program goes into the pre-winding subroutine and the error counters EFL1 and EFL2 are set as described above, the first motor $M_1$ is reversed at step S119 and the timer starts, and then, it is decided whether or not the switch $S_7$ is turned on and whether or not the magnetic head section 1 is in the moveaway position (at steps S120, S121 and S122). If yes, the operations at step S105 and steps subsequent thereto are executed as described above after the first motor $M_1$ stops at step S123. If the magnetic head section 1 is not in the move-away position, at step S124, all functions of the camera stop because an abnormality has occurred.

If it is decided at step S108 that the magnetic head section 1 is in the data processing position although the film has not been wound around the spool 7, the error counter EFL1 is incremented by "1" at step S125. It is decided at step S126 whether or not the counted number is four or more, i.e., whether or not errors occurred four times or more. If no, the program jumps to step S119 from which the subsequent operations are executed as described above. If yes, at step S127, the operation of the camera stops because an abnormality has occurred.

If it is decided at step S108 that the magnetic head section 1 is still in the move-away position and at step S109 that the film is not wound around the spool 7 in the predetermined period of time, the error counter EFL2 is incremented by "1" (at step S128). It is decided at step S129 whether or not the counted number is four or more. If yes, the function of the camera stops at step S133 because an abnormality has occurred. If no, there is a possibility that the film has been sent out from the film loading chamber in some extent previously. Therefore, the motor $M_1$ is reversed for the predetermined period of time so as to completely rewind the film sent out from the cartridge at steps S130, S131 and S132. Then, the program returns to step S104 from which the operations are performed again as described above.

Figure 25B:
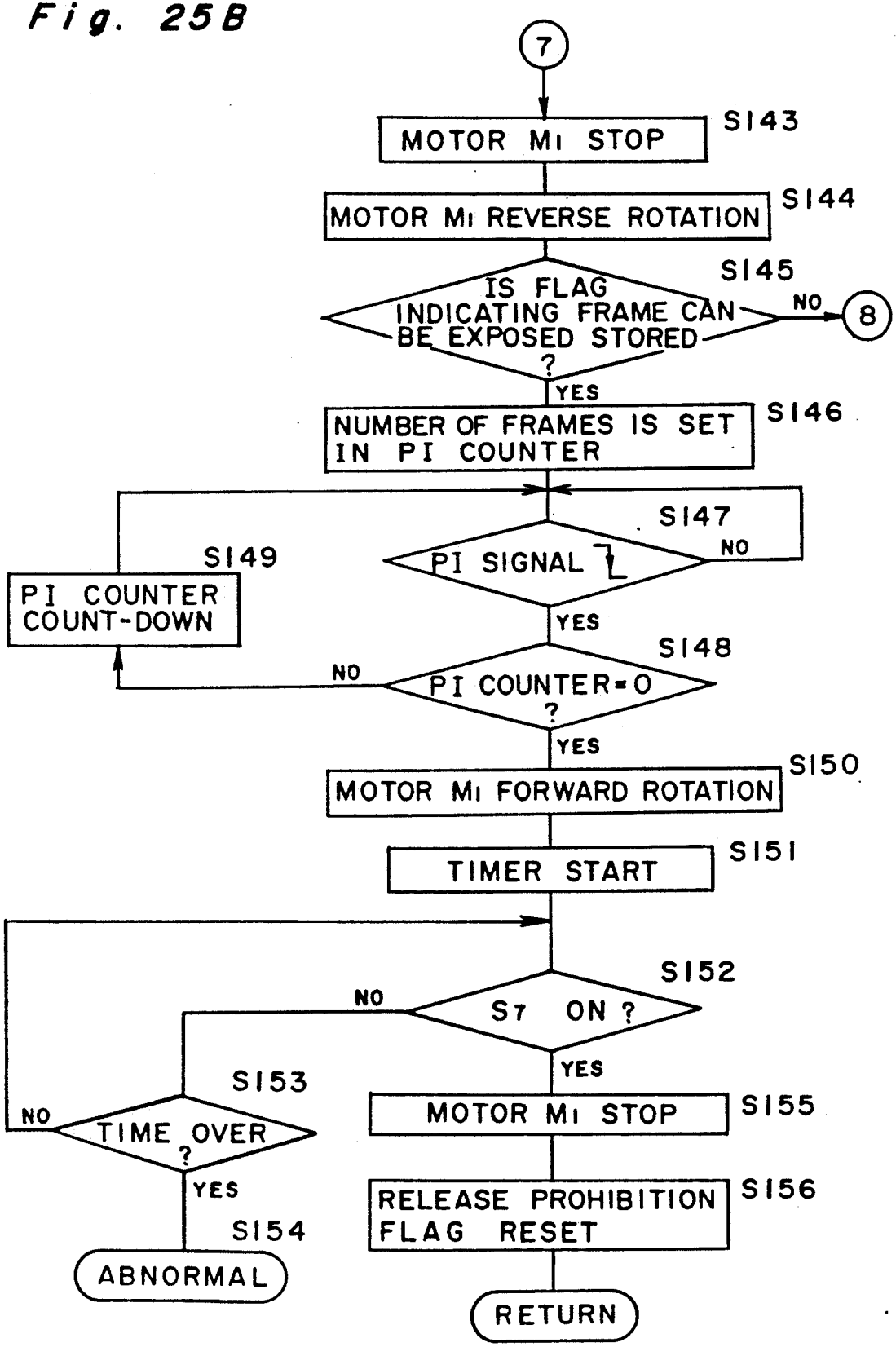
Figure 25C:
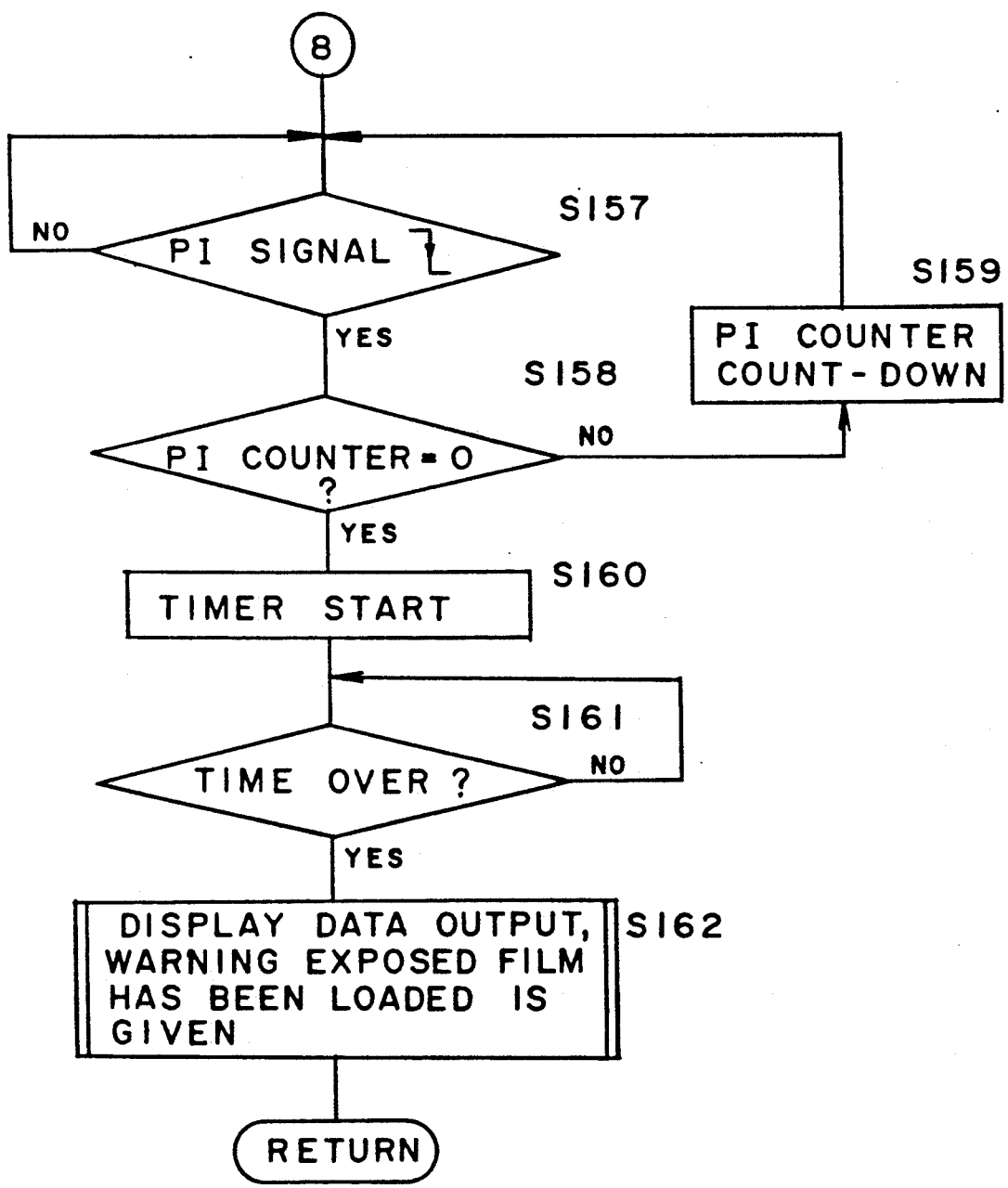

When the pre-winding operation starts with the magnetic head section 1 set in the data processing position at step S116 in the above-described flow, operations are sequentially executed according to the flowchart shown in FIG. 25. At step S134, the program goes into the subroutine of data reading/processing in which the data of the film sensitivity and the number of frames to be exposed are read and processed by the microcomputer CP. At steps S135 and S136, it is decided according to the operation of the motor $M_1$ at step S114 whether or not the signal of the photointerrupter PI has detected the following frame, namely, whether or not one frame of the film is sent out from the film loading chamber, and it is decided that the predetermined number of frames has been sent to the film winding chamber. If no, the PI counter is incremented by "1" (at step S137).

Normally, photographic data is written onto a frame after the frame is exposed. Therefore, it is decided at step S138 and S139 whether or not photographing data has been recorded on a frame sent out from the film loading chamber. If no, i.e., if it is decided that the frame can be exposed, a flag indicating that photographing operation can be performed is set in a predetermined area of a memory map in order to store that the frame corresponding to the content of the PI counter can be exposed at step S140. Then, operations are performed at step S135 and steps subsequent thereto until the predetermined number of frames are sent out from the cartridge 6. If it is decided at step S139 that data has been recorded on the frame, it is decided at step S141 whether or not the flag NFL is set to "1" to check whether or not the cartridge is re-loaded. If yes, the flag indicating that photographing can be performed is reset in the predetermined area of the memory at step S142 so as to store that the frame corresponding to the PI counter cannot exposed. Then, operations are performed at step S135 and steps subsequent thereto until the predetermined number of frames are sent out from the cartridge 6.

Figure 10:
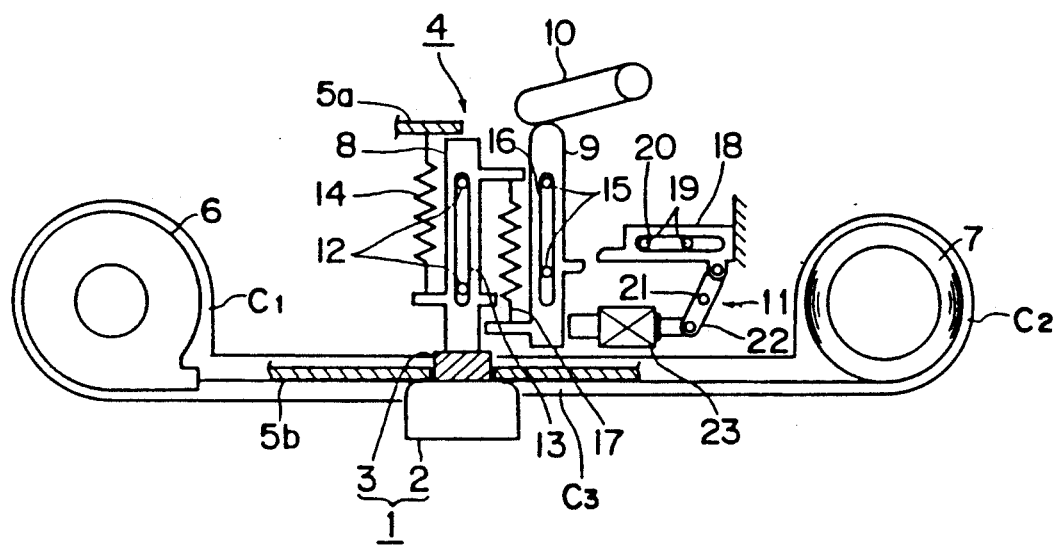
Figure 11:
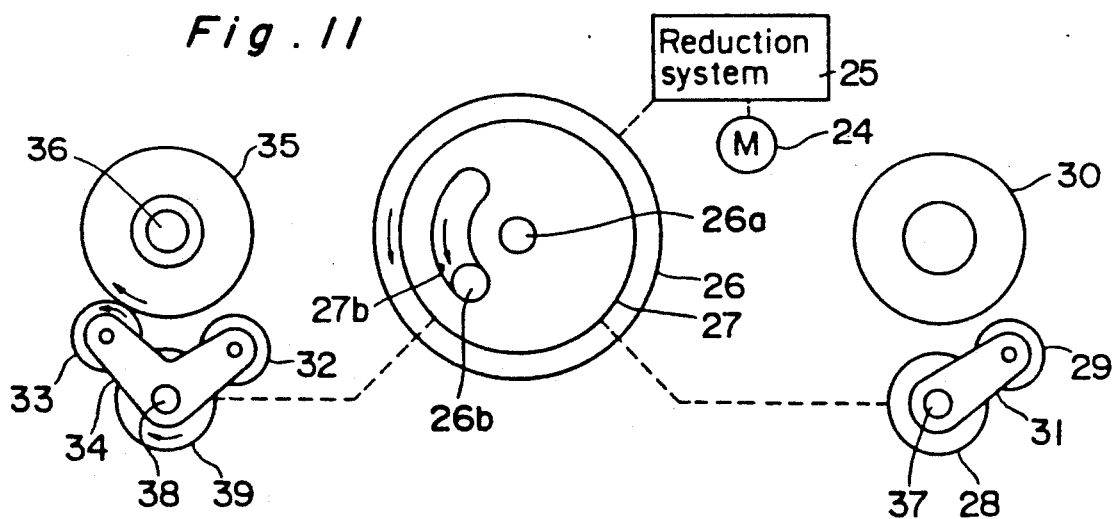

When the predetermined number of frames has been pre-wound with reading photographing data, at steps S143 and S144, and the motor $M_1$ stops is reversed in preparation for a regular rewinding operation. As shown in FIG. 11, the planetary gear 29 disengages from the spool gear 30 and the fork gear 35 is reversed by a the planetary gear 33, so that the film can be wound back to the cartridge 6. It is decided at step S145 whether or not the flag indicating that photographing can be performed is set in the memory so as to check whether or not any frames of a loaded film can be exposed. If yes, the number of frames to be sent out from the film winding chamber to the film loading chamber is set at step S146 and at steps S147 through S149, frames corresponding to the number of frames thus set are sent out from the film winding chamber. As shown in FIG. 10, the lever 10 presses the second rod 9 toward the magnetic head 2 when the motor $M_1(24)$ is reversed as well as it rotates forward so that the magnetic head section 1 can be retained in the data processing position.

As described above, since whether data is recorded on each frame or not can be checked during the pre-winding operation, unexposed frames can be reliably detected and from the unexposed frames exposing goes on, so that the frames are not doubly exposed. Therefore, a user can take out the cartridge from the film loading chamber as necessary before all frames are exposed. Further, it is unnecessary for the user to detect by himself whether or not frames have been exposed since the detecting is carried out by the pre-winding operation.

When exposed frames are all sent out from the film winding chamber to the film loading chamber, the motor $M_1$ starts rotating forward at step S150. At the same time, it is decided at steps S151, S152, and S153 whether or not the magnetic head section 1 is placed in the move-away position in the predetermined period of time. If it is decided that the magnetic head section 1 is still in the data processing position, all the functions of the camera stop at step S154 because an abnormality has occurred If it is decided that the magnetic head section 1 is set in the move-away position in the predetermined period of time, the motor $M_1$ stops at step S155, and then, at step S156, the release prohibition flag is reset. Thus, the preparing operation for taking photographs has been completed and the The driving mechanism is set as shown in FIGS. 12 and 13. As shown in FIG. 13, in order to set the magnetic head section 1 in the move-away position, the output gear 27 is not rotated but the input gear 26 rotates within the sliding range in the groove 27b of the projection 26b of the input gear 26. If the input gear 26 rotates beyond the groove 27, the output gear 27 rotates together with the input gear 26 and the film is sent. At the same time, the lever 10 pivots so as to press the second rod 9 toward the magnetic head 2.

If it is decided at step S145 that all frames have been exposed to light, i.e., if a cartridge containing exposed film has been loaded into the film loading chamber, the film is rewound until the content of the PI counter is decremented to "0" at steps S157 through S159 because the motor $M_1$ is reversed at step S144. Then, at steps S160 and S161, the film sent in the automatic loading is rewound in a predetermined period of time. At step S162, a warning indicating that the loaded film of the cartridge has been exposed is displayed. Then, the program returns to the main routine. Therefore, the photographer can take out the cartridge from the film loading chamber and load a new cartridge thereinto.

If it is decided at step S139 that photographing data has been recorded on the frame while it is decided at step S141 that the flag NFL is not set to "1" when the each frame data in the pre-winding operation is decided, it follows that although the display means 50 indicates that the frame has not been exposed, the photographing data has been recorded on the frame. This may be due to an abnormal operation of the detecting means 55 concerning to whether the film is exposed or not of the camera body or the mistake of the function of the slide member 52 of the display means 50 of the cartridge. In order to avoid a photographing error such as a double exposure, the following operations are performed.

The motor $M_1$ is stopped and reversed at steps S163 and S164 to rewind frames which have been sent until the PI counter is decremented to "0" at step S165 through step S167. At steps S168 and S169, frames sent in the automatic loading are further rewound. After a warning indicating that the loaded cartridge is inappropriate is displayed at step S170, the program returns to the main routine. Accordingly, the photographer also can take out the cartridge from the film loading chamber and load a new cartridge thereinto, so that a photographing error can be avoided.

If it is decided that photographic data has been recorded on the cartridge which is not used, it is possible to form a program so as to take a photograph with the cartridge which is not used. The flow of the program is as shown in FIG. 26. Except some steps, operations same as those of FIG. 25 are performed. In FIG. 26, the same operation is denoted by the same step number as in FIG. 25.

Figure 26A:
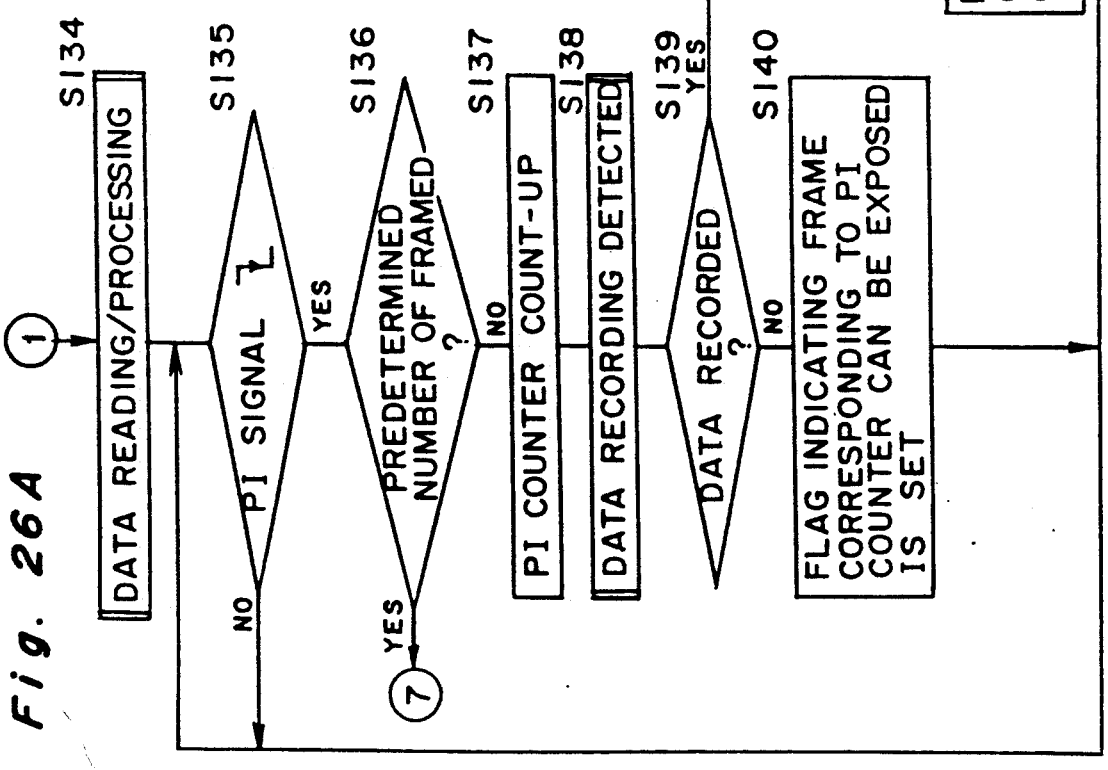
Figure 26B:
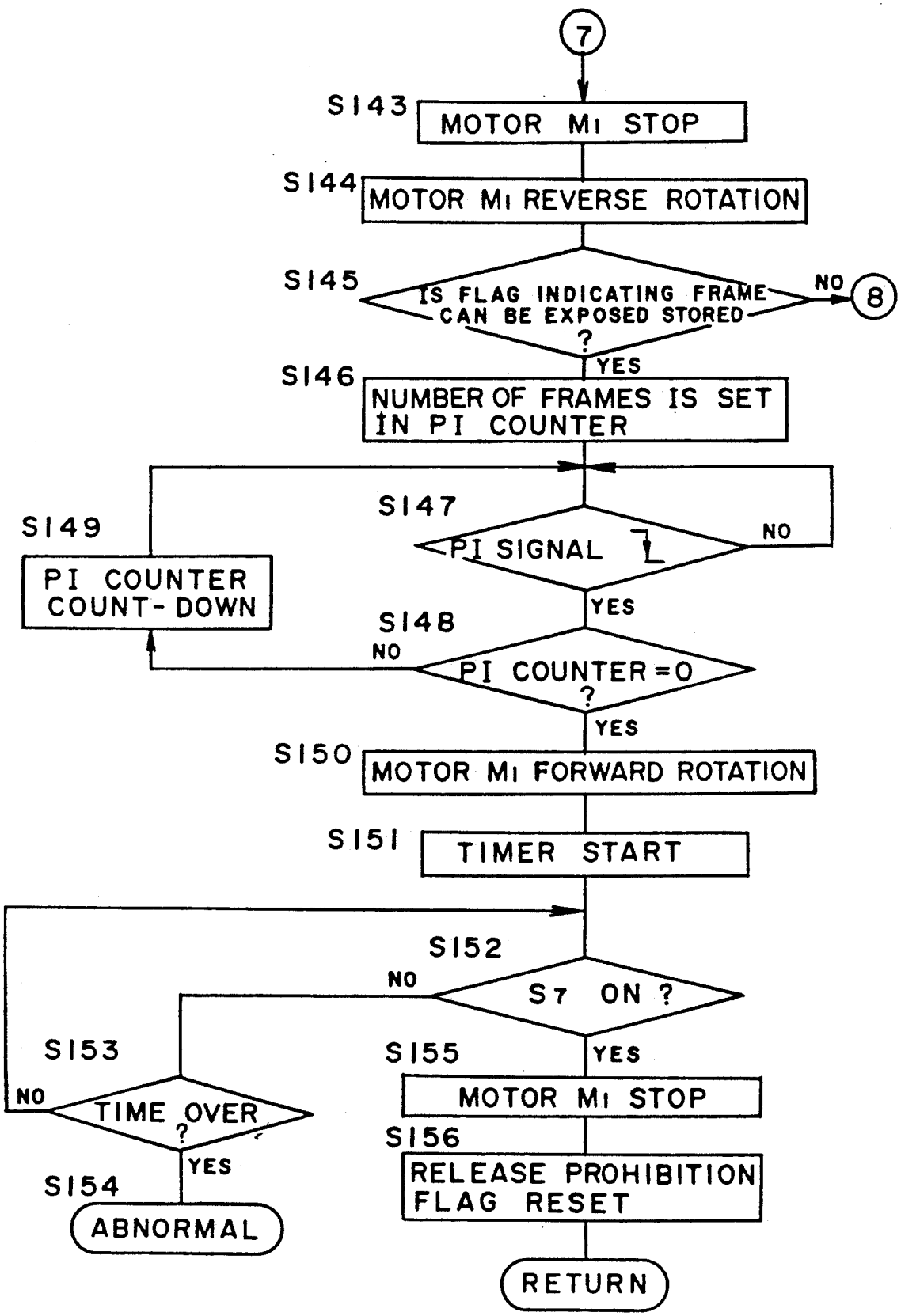
Figure 26C:
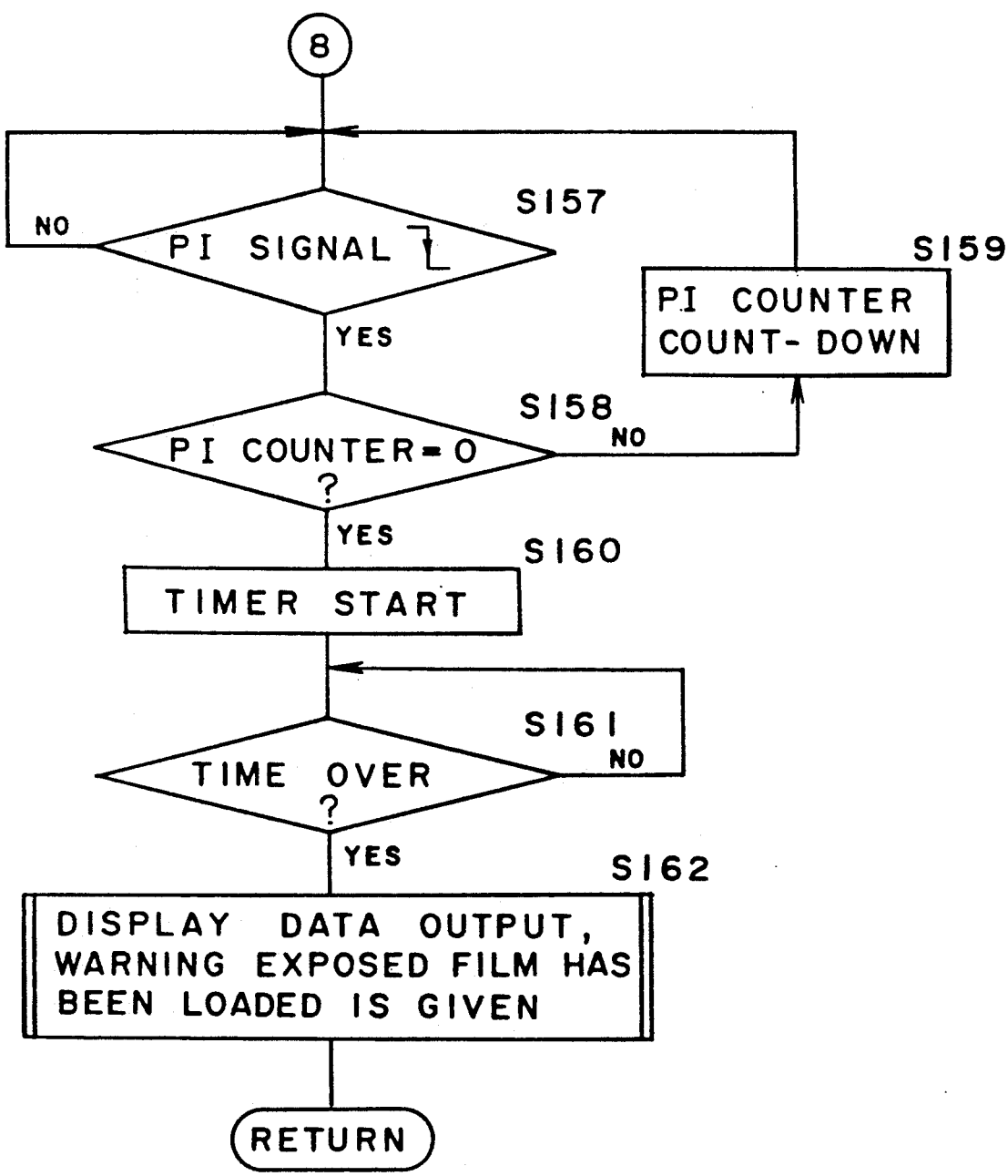

Referring to FIG. 26, if such a contradictory decision is made at steps S139 and S141, a warning indicating that the film has an error is displayed on the film at step S171. Then, at step S142, the flag indicating that photographing can be carried out is reset in the predetermined area of the memory so as to store that the frame corresponding to the content of the PI counter cannot be exposed. Then, operations are repeated from step S135 and steps subsequent thereto for each of the predetermined number of frames. That is, in this flow of FIG. 26, a warning is given to the photographer but decided data has a preference so that the photographer can take a photograph. By providing such a program, the photographer can take a photograph even though the display means 50 functions by mistake. The above description relates to the operation to be performed when the film is pre-wound.

Figure 27A:
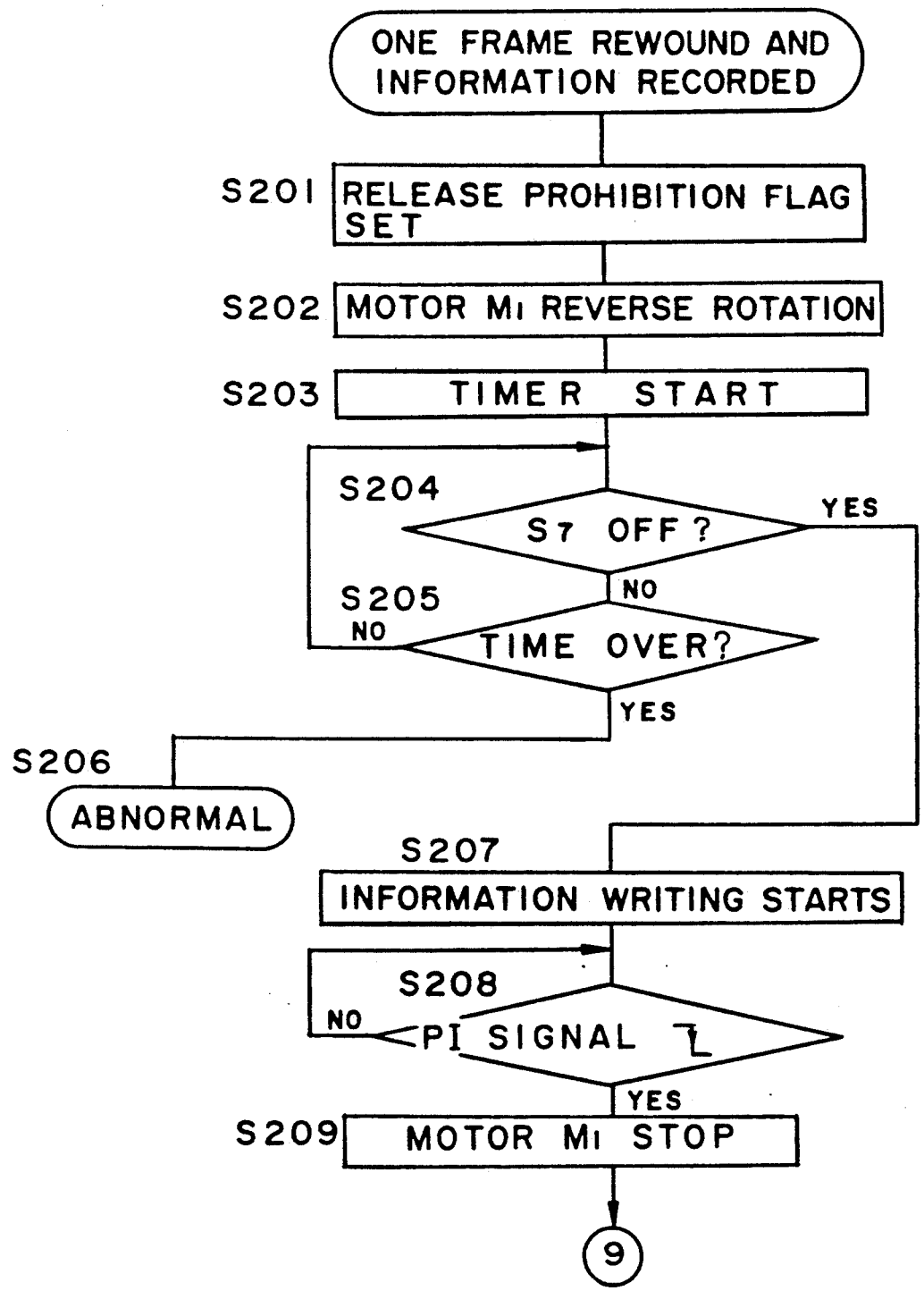
Figure 27B:
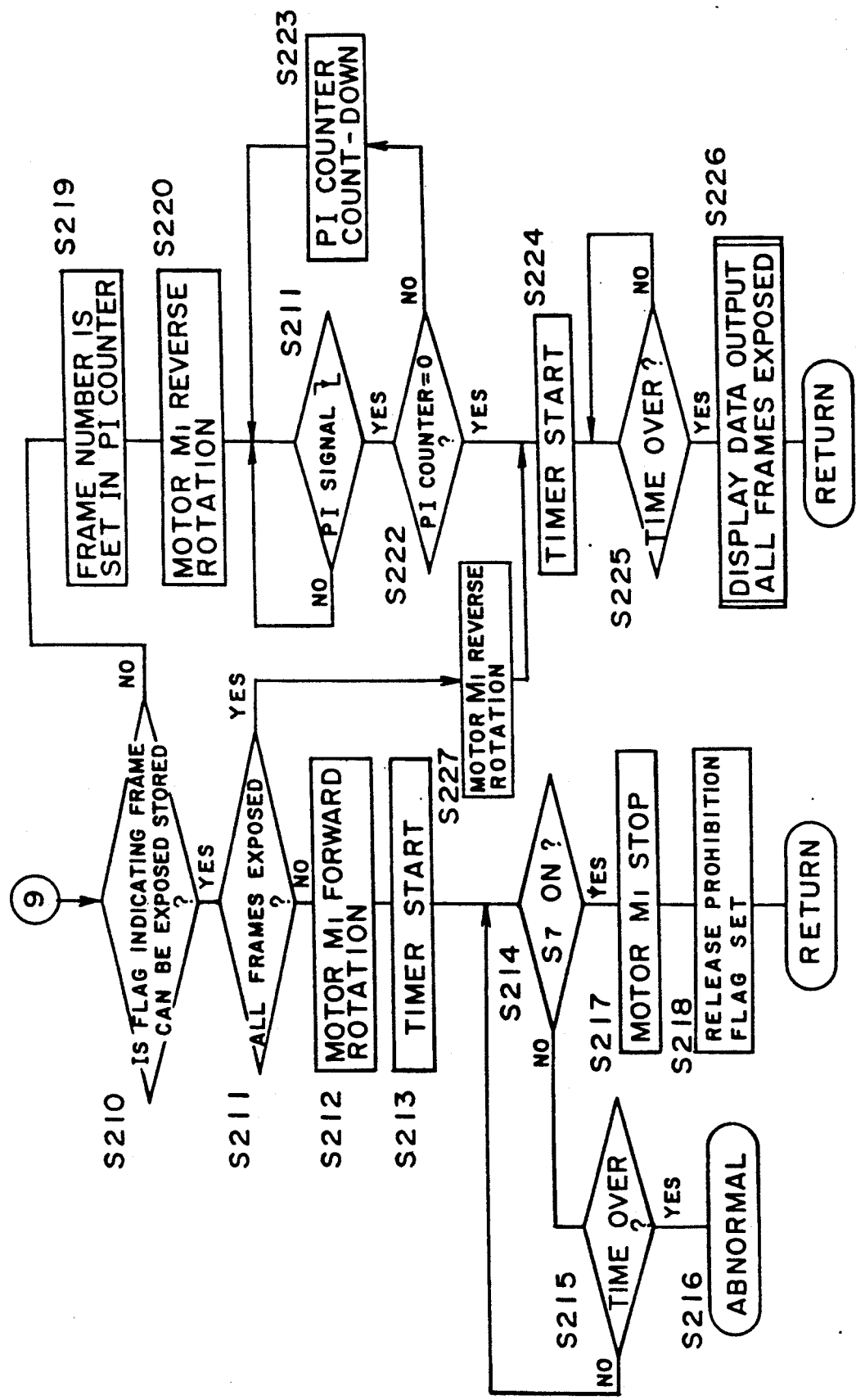

The subroutine for rewinding one frame into the cartridge and processing information executed at step S019 of the main routine shown in FIG. 23 is described in detail with reference to the flowchart shown in FIG. 27 and the operation condition views shown in FIG. 14 through FIG. 17.

First, at step S201, the release prohibition flag is set to prevent the shutter from being released while the film is being rewound. Then, the motor $M_1$ starts reversing at step S202. At step S203, the timer starts counting. It is decided at step S204 and S205 whether or not the switch $S_7$ is OFF to check whether or not the magnetic head section 1 is set in the data processing position. If the magnetic head section 1 is still in the move-away position, the function of the camera stops at step S206 due to an abnormal operation.

Figure 14:
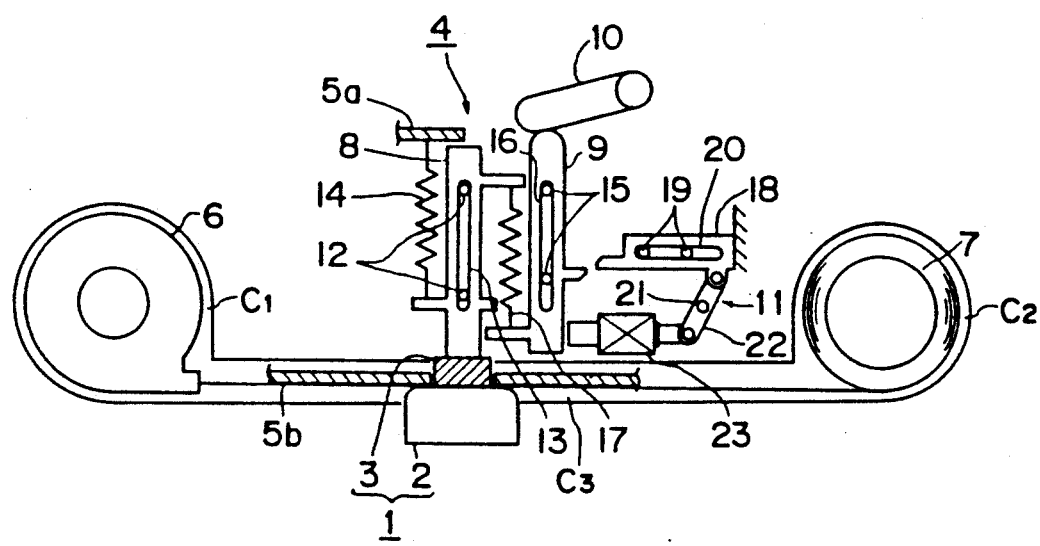
Figure 15:
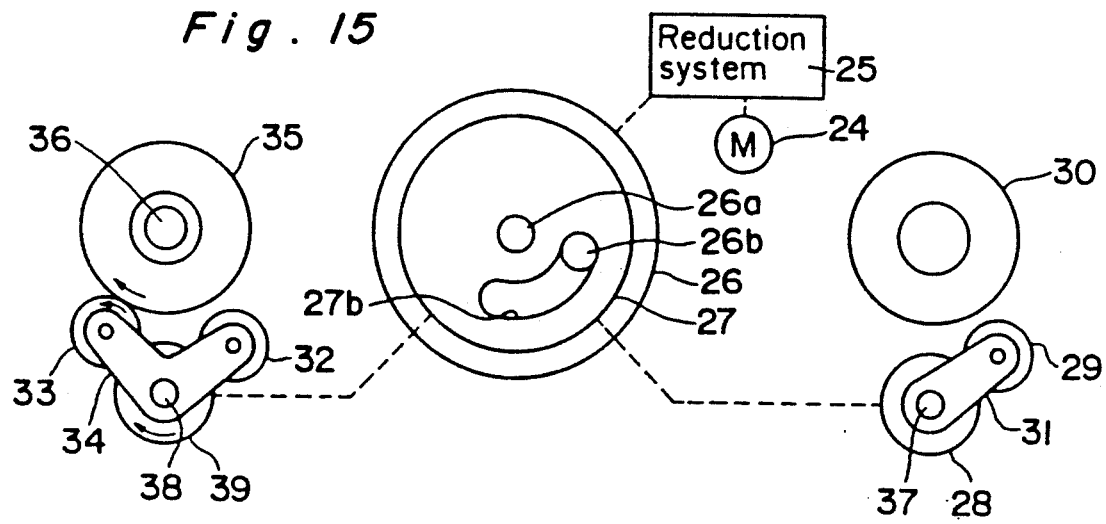

If the magnetic head section 1 is set in the data processing position, photographing information is written onto the film at step S207. The condition of this operation is shown in FIGS. 14 and 15. If it is decided at steps S208 and S209 that one frame is sent toward the film loading chamber by switching the level of the PI signal, the motor $M_1$ stops.

Figure 16:
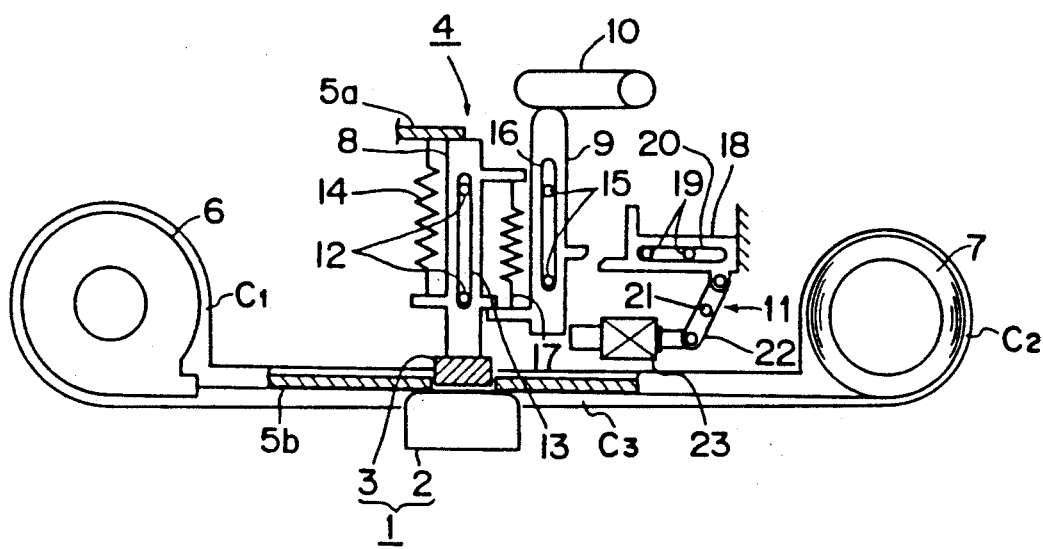
Figure 17:
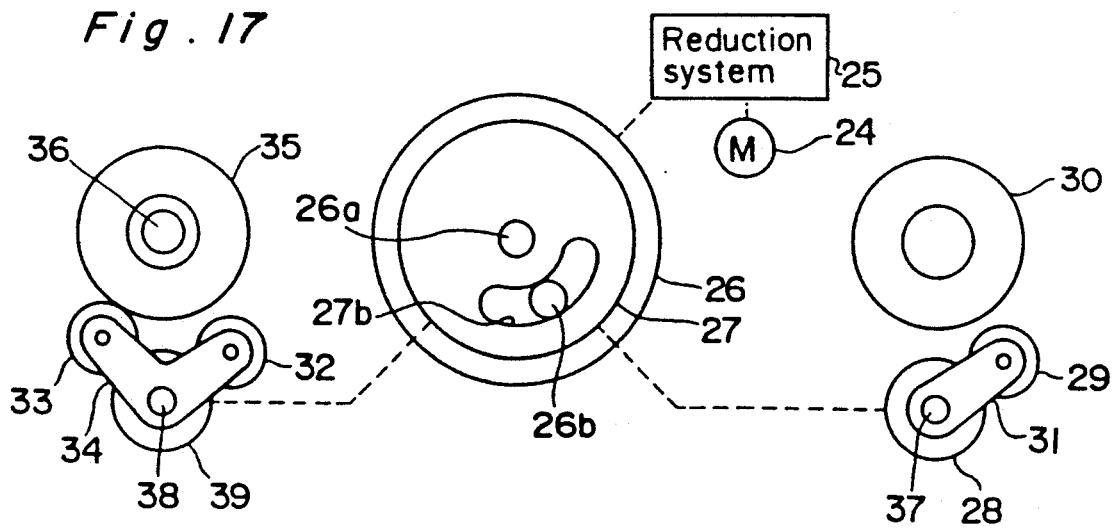

Comparing the cases that the film is exposed after pre-winding and without pre-winding, the film is exposed from the contrary leading end potion each other. Therefore, when the loaded film has been exposed partly without the pre-winding operation or when the both leading end portions of the film have been exposed by regular photographing and photographing after the pre-winding operation, a frame next to the wound frame can be exposed one. So, whether or not the frame has been exposed can be discriminated at step S210 according to whether or not the flag indicating that photographing can be performed is set in the memory. If the flag indicating that photographing can be performed is set, it is decided at step S211 whether or not all frames of the film are exposed. If no, the motor $M_1$ starts rotating forward at step S212. Then, it is decided whether or not the switch $S_7$ is turned on in the predetermined period of time to discriminate whether or not the magnetic head section 1 is switched to be located in the move-away position (steps S213–S215). If the magnetic head section 1 is not switched to be located in the move-away position, all the function of the camera stops at step S216 due to an abnormal operation. If the magnetic head section 1 is switched to be located in the move-away position, the motor $M_1$ stops at step S217, and the release prohibition flag is reset at step S218 so that a photograph can be taken. FIGS. 16 and 17 show this condition.

As described above, the magnetic head section 1 is usually set to be located in the move-away position and only when the the film is pre-wound or rewound, it is set to be located in the data processing position by driving force of the winding motor. This structure eliminates the provision of special means or electric power for holding the magnetic head section 1 in each position. In addition, the controlling of the position of the magnetic head section 1 can be accomplished by a simple mechanism, so that this structure needs a small space and reduces cost.

If it is decided at step S210 that the flag indicating that photographing can be performed is not set when it is decided whether or not the set frame has been exposed the frame number at that time is set in the PI counter at step S219. The film is rewound until the PI counter is decremented to "0" at steps S220 through S223. Frames sent in the automatic loading are rewound at steps S224 and S225. Then, a display indicating that all frames are exposed is made at step S226 and the program returns to the main routine.

If it is decided at step S211 that all frames have been exposed, the program jumps to step S224 through step S227. After the frames sent in the automatic loading are rewound, a display indicating that all frames have been exposed is made at step S226 and the program returns to the main routine. Unexposed frame and ar all detected during the pre-winding operation and the film is rewound when all frames are exposed based on the data processed during the pre-winding. Therefore, even though a film ejected from the film loading chamber before all frames are exposed, the cartridge containing the film can be re-loaded thereinto and a double exposure does not occur.

In the camera, the pad 3 of the magnetic head section 1 is movable, but it is possible to modify the magnetic head section 1 so that the pad 3 may be stationary and the magnetic head 2 may be movable. A mechanism for detecting the sending amount of the film and mechanically switching the position of the magnetic head section 1 may be provided instead of the plunger 23 for controlling the position of the magnetic head section 1.

A second embodiment of the present invention is described below with reference to FIG. 31 through 39.

Figure 31:
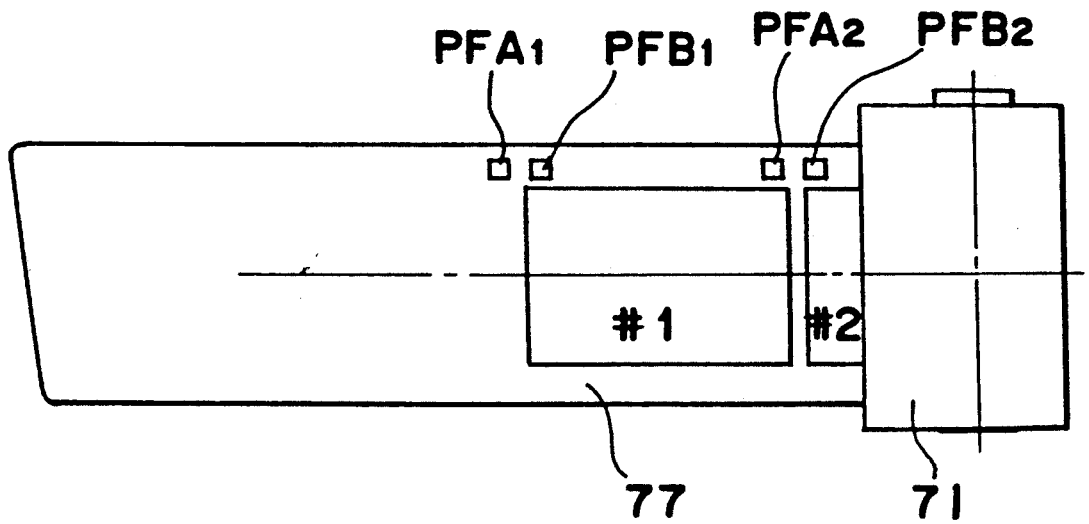
FIG. 31 is a schematic view of the film to be used in the second embodiment in the present invention.

FIG. 31 shows a film to be used by the camera of the present invention. The film is completely contained in the cartridge 71 when the film has not been exposed, and similarly to the first embodiment, when the cartridge 71 is loaded into the film loading chamber, the film is pressed out therefrom by the above-described mechanism.

The first frame is exposed at a position denoted by #1 and from the position to the end of the film is a leading area. The perforation $PFA_1$ is positioned forward from the first frame #1. The perforation $PFB_1$ is positioned at the leading end of the first frame #1. The perforation $PFA_2$ is positioned at the rear end of the first frame #1. Perforations are provided for each frame similarly. That is, a perforation $PFB_M$ is positioned at the leading end of an M-th frame and a perforation $PFA_{M+1}$ is positioned at the rear end of an M-th frame.

Figure 32:
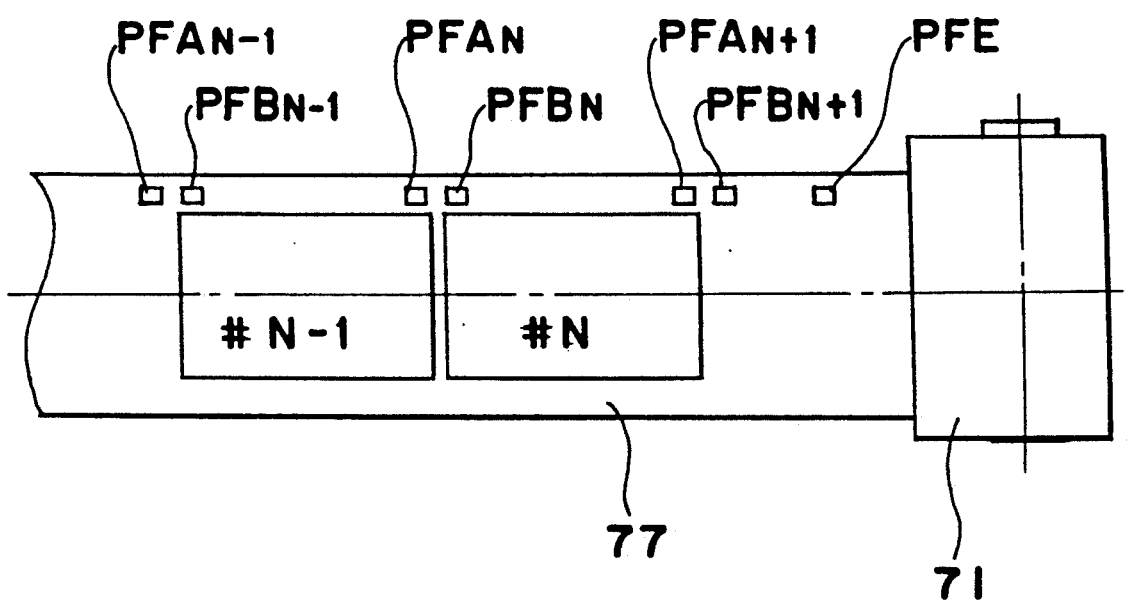
FIG. 32 is a schematic view showing the structure of the last frame of the film provided in the second embodiment in the present invention.

FIG. 32 shows the structure of the last frame #N, of the film 77. Similarly to each frame, the perforation $PFA_{N+1}$ is provided at the rear end of the frame #N. The perforation $PFB_{N+1}$ is positioned backward from the frame #N. The perforation PFE showing that the frame positioned immediately thereto is the last frame is formed between the perforation $PFB_{N+1}$ and the cartridge 71.

Figure 33:
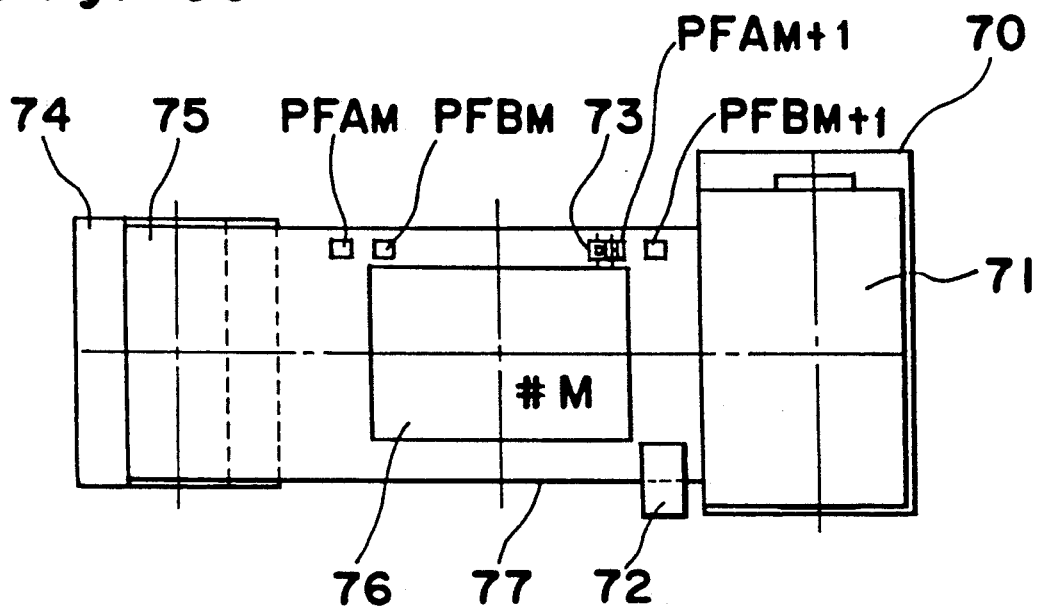
FIG. 33 is an arrangement view of the each portion in loading the film in the camera.
Figure 34:
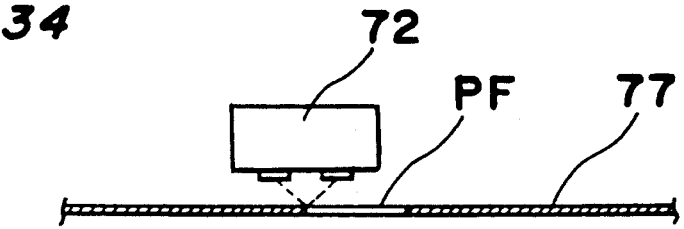
FIGS. 34 and 35 are a sectional view and a top plan view showing the relation of a photointerrupter and the film.
Figure 35:
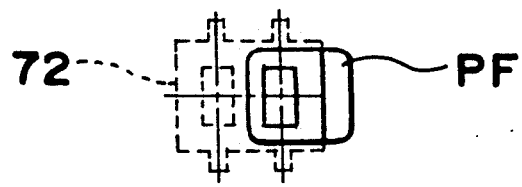

FIG. 33 is an arrangement view of the each portion in loading a film in a camera. Referring to FIG. 33, reference numeral 70 denotes a film loading chamber or a cartridge accommodating chamber; 71 indicates the cartridge; 72 indicates a section for reading/writing magnetic information; 73 represents a photointerrupter; and 76 shows an exposure position. The position relationship between the film 77 and the photointerrupter 73 is as shown in FIGS. 34 and 35. Emitted light reflected by the film 77 is incident on a light receiving element when the film is loaded, while the reflected light is not incident on the light receiving element when there is the perforation PF. Whether or not the film is in the exposure position and the presence of perforations are detected by the above incident light. FIG. 33 shows the condition in which the M-th frame is accurately placed in the exposure position 76.

Referring to FIG. 33, reference numeral 75 denotes a spool; 74 denotes a film winding chamber. Considering the length of the leader area of the film in FIG. 33, if the photointerrupter 73 detects the perforation $PFA_1$, it is regarded that the leading area of the film has been wound around the spool. Therefore, the second embodiment eliminates the provision of the switch $S_6$, of the first embodiment, for detecting that the film has been wound around the spool.

FIG. 36 through 39 are flowcharts for describing the operation of the second embodiment of the present invention. The electric circuit (FIG. 18) of the camera according to the second embodiment is substantially the same as that of the camera according to the first embodiment. However, a switch $S_{10}$ for detecting whether or not the cartridge has been inserted into the film loading chamber is provided in addition to the switches $S_1$ through $S_9$. In the first embodiment, a positive pulse voltage or a negative pulse voltage is applied to the plunger PL to set the magnetic head section either in the data processing position or in the move-away position. The plungers PL according to the second embodiment are attracted to each other when electric current flows therethrough, thus allowing the movement of the first rod 8 and the second rod 9, but when electric current is cut off, they move away from each other, thus preventing the movement of the first rod 8 and the second rod 9.

Figure 36:
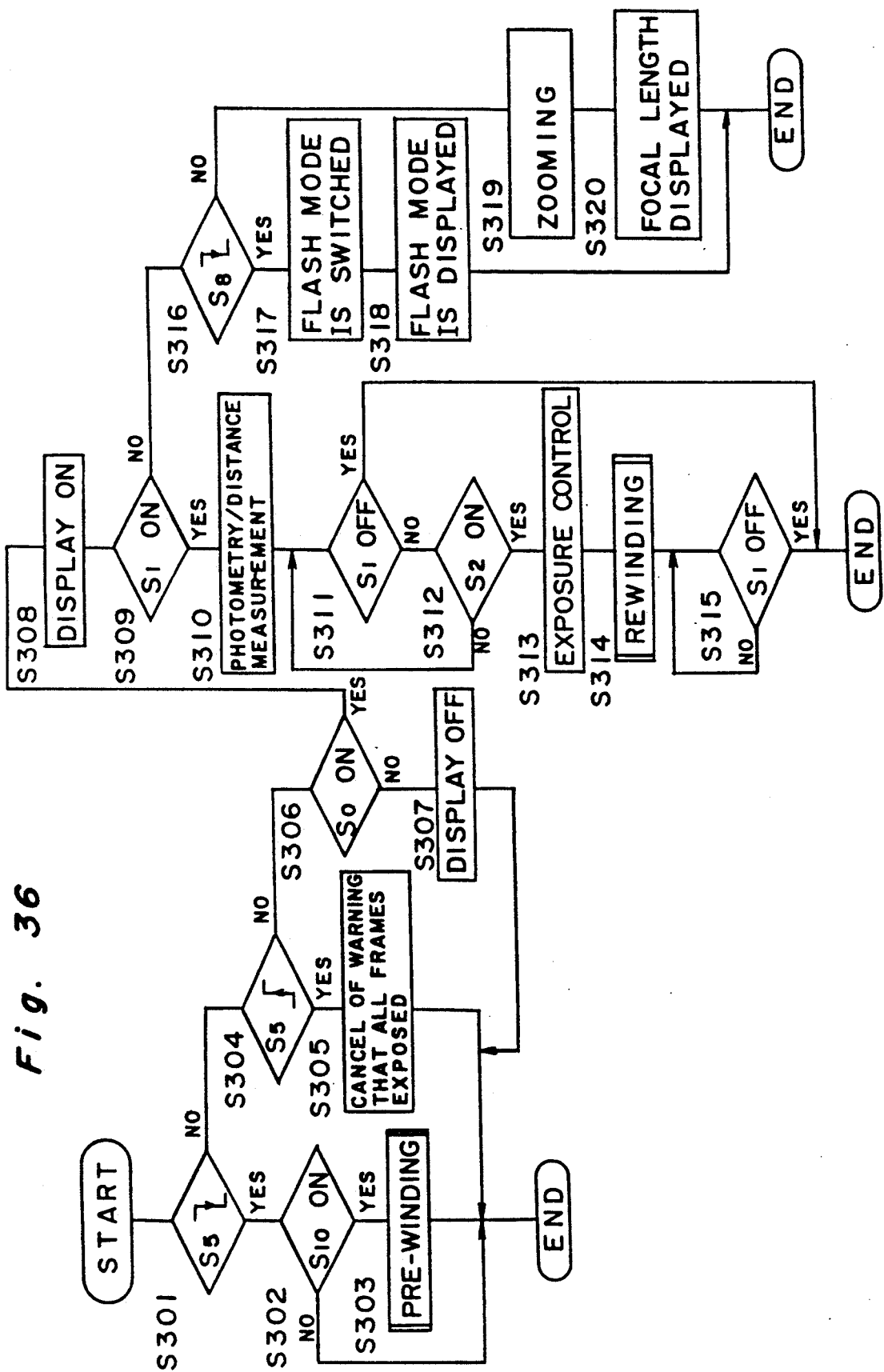
FIG. 36 through FIG. 39B flowcharts showing the operation of the camera in the second embodiment in the present invention.

FIG. 36 is a flowchart showing the entire operation of the camera. First, it is decided at step S301 whether or not the microcomputer CP operate by turning on the switch $S_5$ with the closing of the bottom cover (the cartridge lid) of the film loading chamber 70. If the switch $S_5$ is turned on, it is decided at step S2 whether or not the cartridge 71 is loaded into the film loading chamber 70. If the cartridge 71 is not loaded thereinto, the operation stops. If the cartridge 71 is loaded thereinto, the subroutine for pre-winding the film is executed at step S3. The detail of this subroutine is described with reference to FIGS. 37 and 38.

If it is decided at step S301 the operation is not by turning on of the switch $S_5$, it is decided at step S304 whether or not the turning off of the switch $S_5$ operates. If yes, a warning indicating that all frames of the film have been exposed is cancelled at step S305 and the operation stops.

If no, it is decided at step S306 whether or not the main switch $S_0$ is turned on. If no, the program does not go to step S308 and following steps, and the display is cancelled at step S307 and the operation stops.

If yes, a display is made at step S308, and it is decided at step S309 whether or not the turning on of the switch $S_1$ operates. If yes, a light measuring operation and a distance measuring operation are performed and data thereof is stored at step S310. Then, the microcomputer CP waits until the release switch $S_2$ is turned on. While the waiting time, if the switch $S_1$ is turned off at step S311, the operation stops. If the switch $S_1$ is turned on at step S312, an exposure control operation is executed at step S313. Then, at step S314, the program goes to the subroutine of rewinding one frame into the cartridge 71. The detail of this subroutine is described later with reference to FIG. 39. After the operation of the subroutine at step S314 is completed, it is decided at step S315 whether or not the switch $S_1$ is turned off. If yes, at step S315, the operation stops.

If no at step S309, it is decided at step S316 whether or not the turning on of the switch $S_8$ of the flash mode operates. If yes at step S316, the display of the flash mode is made by switching the flash mode and the operation stops at step 318.

If no at step S316, the operation is by the zoom switch $S_3$ or $S_4$, and the finder is switched from the telescopic side to the wide angle side or the contrary according to ON or OFF of the zoom switches $S_3$ and $S_4$, a detected focal length is displayed, and the operation stops.

Figure 37A:
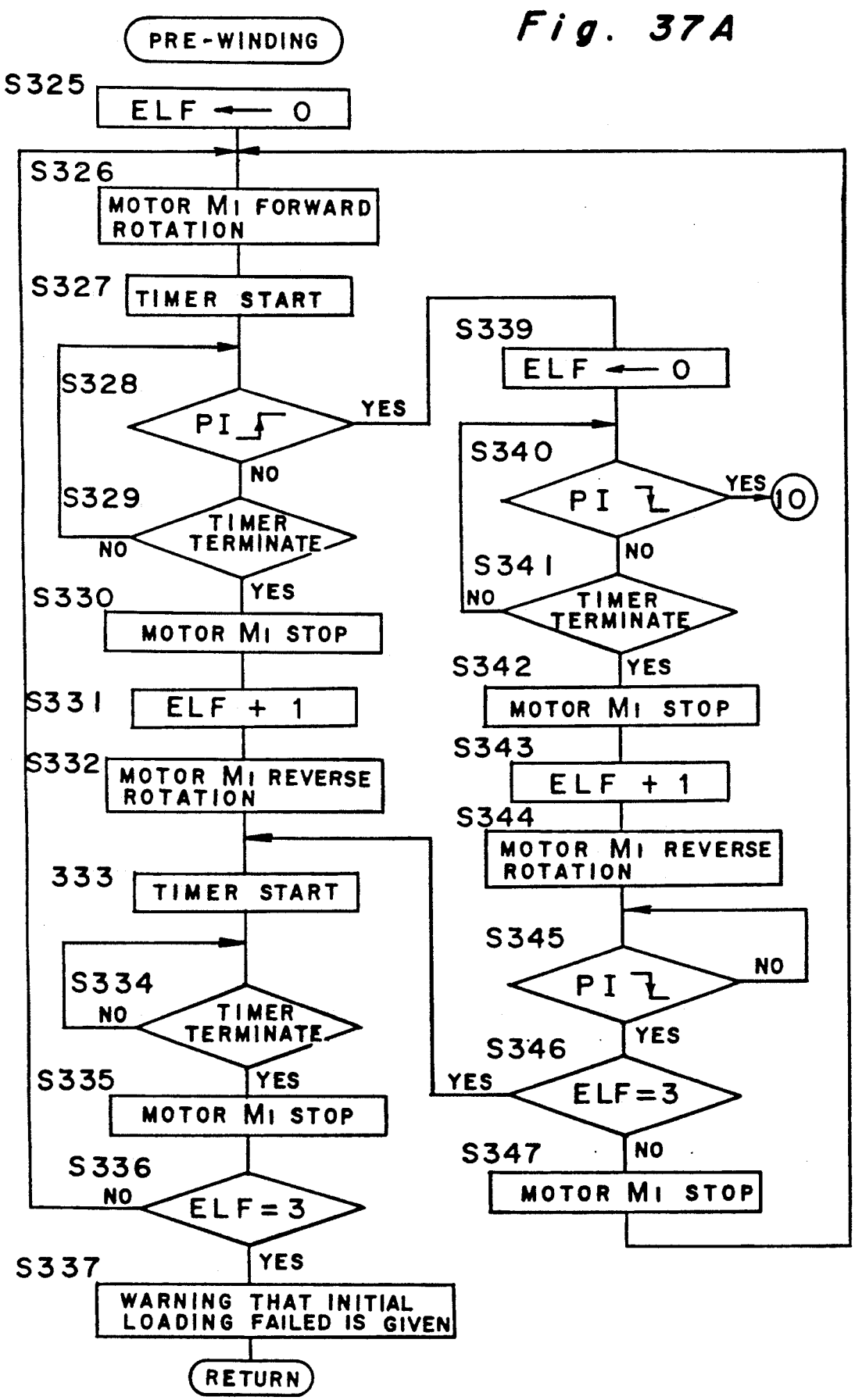
Figure 37B:
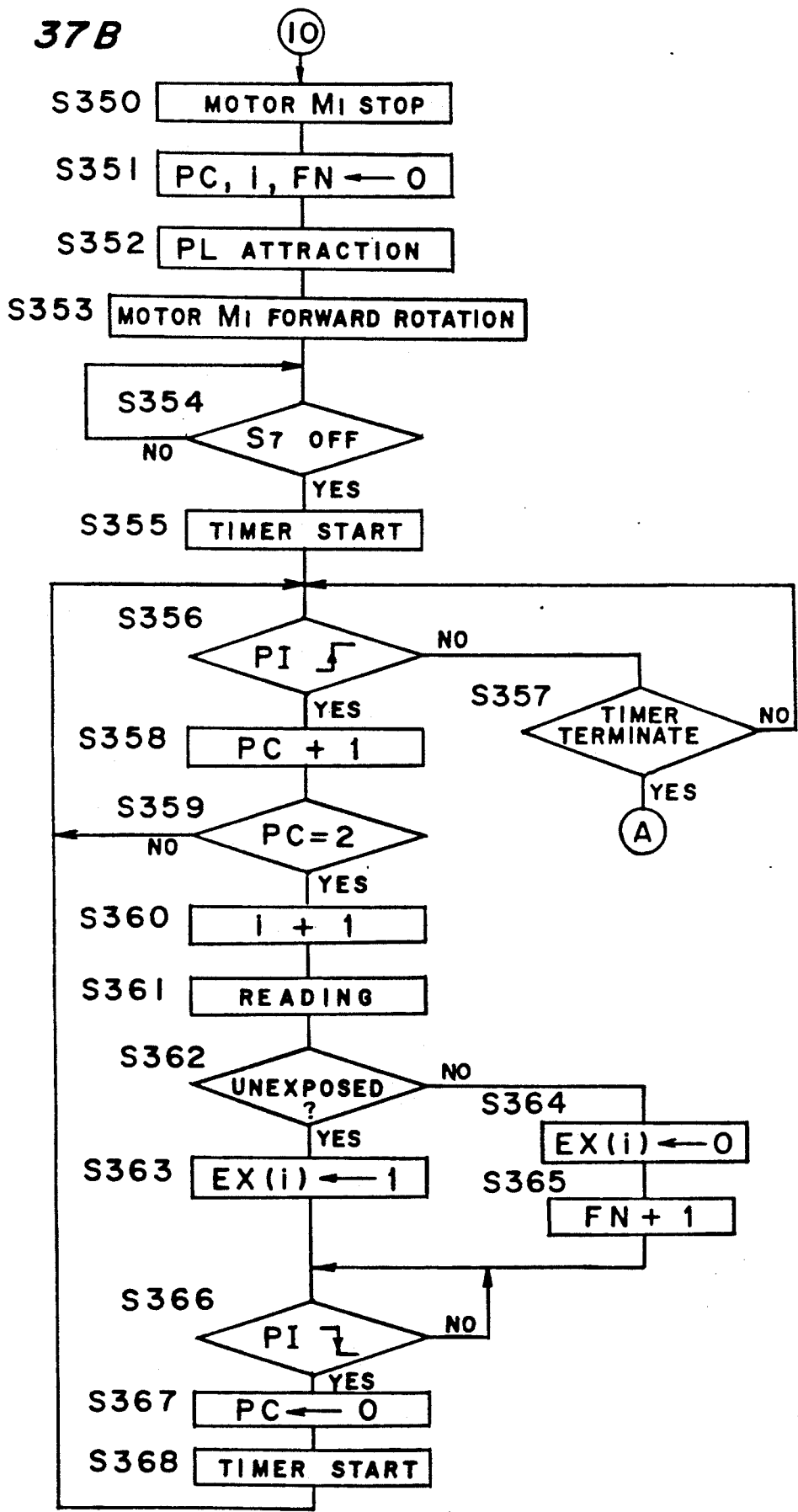
Figure 38A:
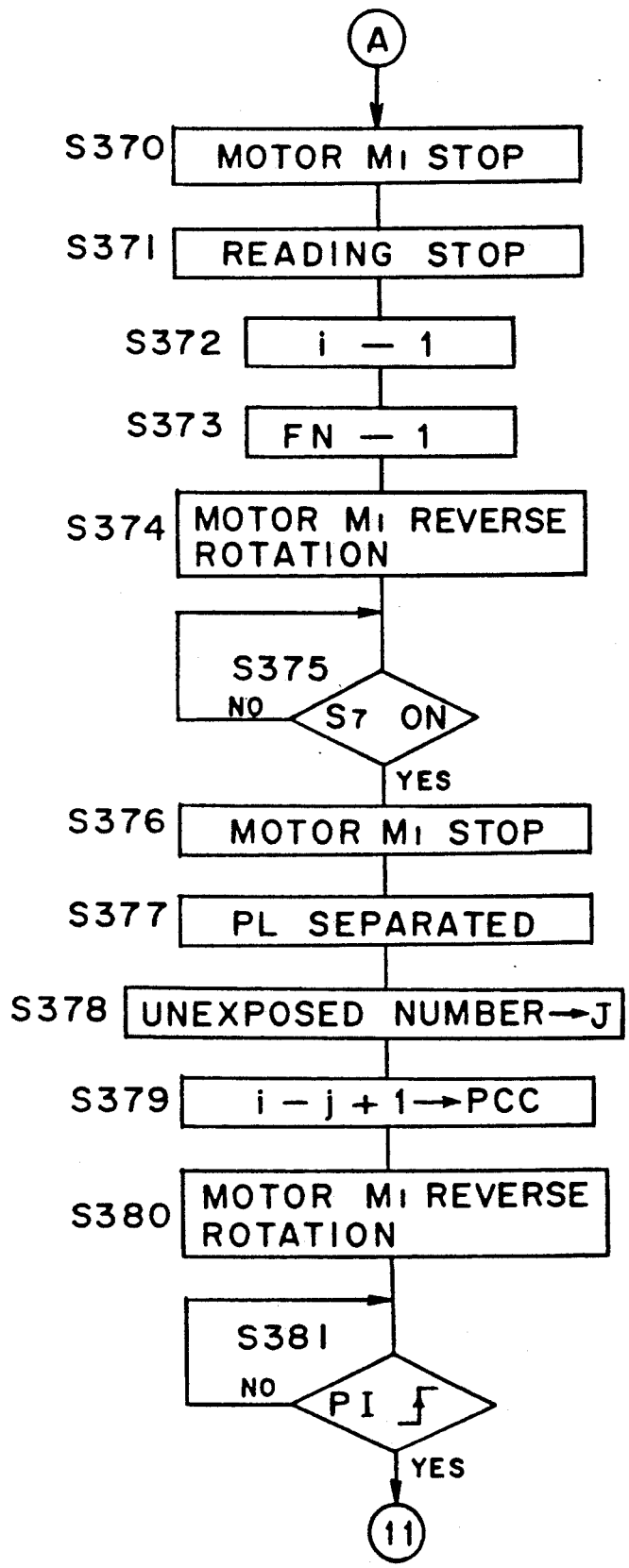
Figure 38B:
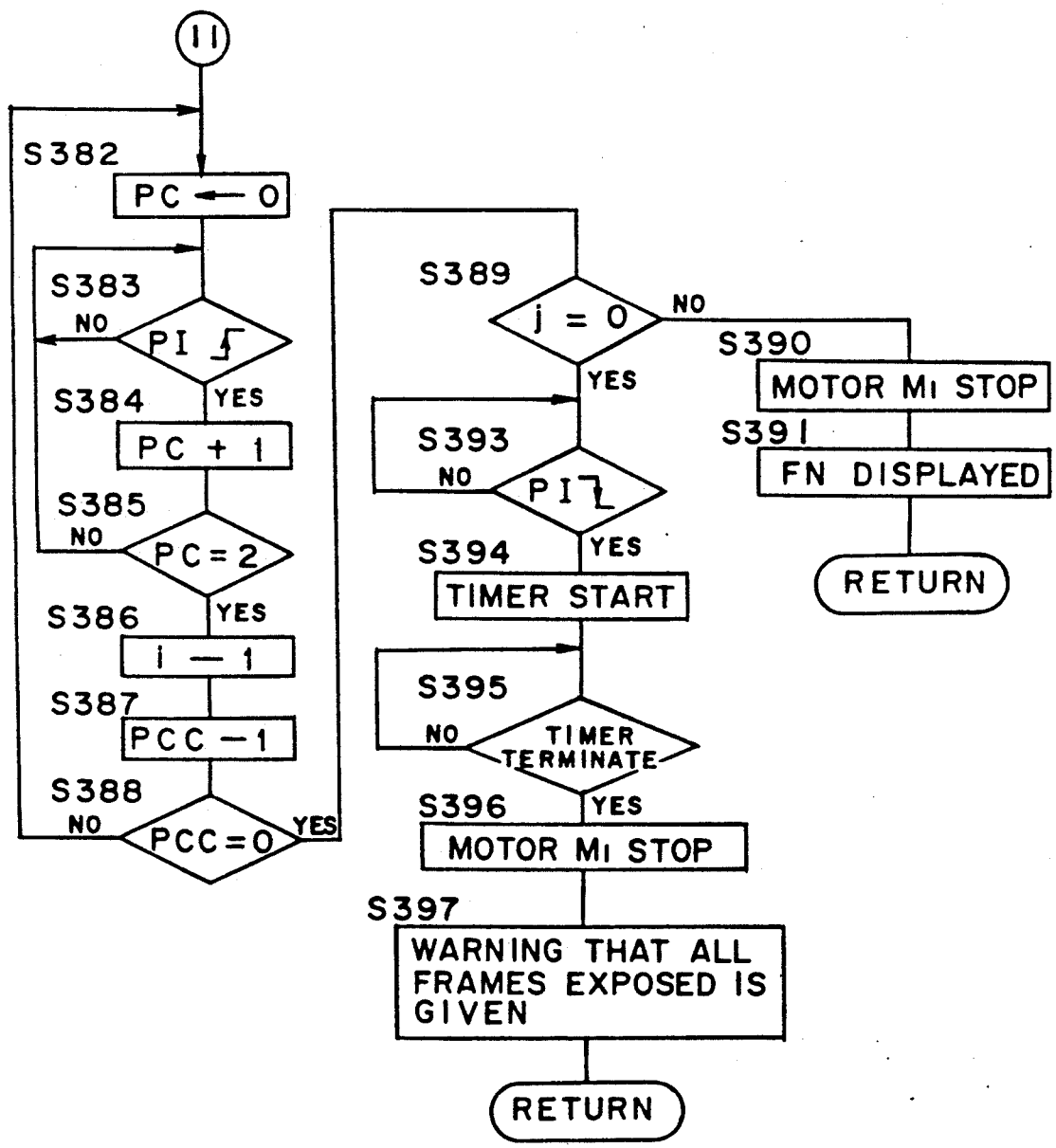

Referring to FIGS. 37 and 38, the operation of the subroutine of pre-winding the film is described below.

First, at step S325, the counter ELF for counting the number of errors in initial loading (the sending of the leading end of the film to the film winding chamber and the winding of the film around the spool thereof) is reset to "0", the motor $M_1$ is rotated forward, and a timer for counting time up to the completion of the initial loading starts. It is decided at steps S328 and S329 whether or not the film is sent to the position of the photointerrupter PI in the predetermined period of time. If it is decided at step S328 that the output of the photointerrupter PI rises at low level and that the leading end of the film is at the position of the photointerrupter PI, it follows that the film is sent out normally from the cartridge 71. The film sent out from the cartridge 71 is transported to the film winding chamber 70 and wound around the spool 75, and at step S340, the microcomputer CP waits until the perforation $PFA_1$ moves to the position of the photointerrupter PI in the predetermined period of time. If it is decided at step S340 that the perforation $PFA_1$ has moved to the position of the the photointerrupter PI, it follows that the initial loading is performed normally and at step S350, the motor $M_1$ is stopped to complete the initial loading.

If it is decided at step S329 that the film is not sent out from the cartridge 71 in the predetermined period of time, the motor $M_1$ is stopped at step S330, "1" is added to the content of the counter ELF for counting the number of errors in the initial loading at step S331, and the motor $M_1$ is reversed at step S332 in the predetermined period of time. This operation is performed to cancel the factor of error by rotating the motor $M_1$ in the direction opposite to the direction in which the film is sent out from the cartridge 71 because there is a great possibility that the leading end of the film is caught by something in the cartridge 71. It is decided at step S336 whether or not the ELF=3. If no, the program returns to step S326 at which an initial loading operation is resumed. If the ELF=3, it follows that the initial loading failed three times. Therefore, it is considered that the cartridge 71 has defect. In this case, a warning indicating that the initial loading failed is displayed, and then the program returns to the main routine (FIG. 36) so as to stop the operation.

If it is decided at step S341 that the film is not wound around the spool 75 and the perforation $PFA_1$ does not arrive at the position of the photointerrupter PI in the predetermined period of time, the motor $M_1$ is stopped at step S342, "1" is added to the content of the counter ELF at step S343, the motor $M_1$ is reversed at step S344, and the film is rewound into the cartridge 71 at step S344. Then, the microcomputer CP waits until the leading end of the film moves away from the position of the photointerrupter PI. If it is decided at step S345 that the film is not at the position of the photointerrupter PI, it is decided at step S346 whether or not ELF=3. If no, the motor $M_1$ is stopped immediately at step S347 and the program returns to step S326 so as to resume the initial loading operation. This operation is carried out because the leading end of the film is sent out from the cartridge 71, but has not reached the film winding chamber 74. In this case, the sending of the film from the cartridge 71 is not required but the rewinding of the film is stopped with the leading end of the film projecting from the cartridge 71 so as to avoid waste of energy and time and not to repeat the operation easy to fail.

If it is decided at step S346 that ELF=3, it follows that the initial loading failed three times because the film has defect that, for example, the leading end of the film curls. Therefore, the initial loading operation stops. Then, the program goes to step S333, the film is rewound completely into the cartridge 71 by keeping rewinding in the predetermined period of time, and a warning indicating that the initial loading of the film is stopped is given, and the operation stops. These operations are performed because if the leading end of the film projects from the cartridge 71 when the initial loading stops, the leading end of the film is caught by something in the film sending path. As a result, the cartridge 71 cannot be taken out from the camera body.

If it is decided at step S340 that the initial loading is normally carried out, all frames of the film are taken out from the cartridge 71 and the information of the exposure or non-exposure of each frame is read by the magnetic head HD. The forward rotation of the motor $M_1$ to perform the initial loading stops at step S350. Then, the register PC for counting the number of perforations, the register i for frame number, and the register FN for counting the number of unexposed frames are reset to "0" at step S351. At step S352, in order to move the magnetic head, which is stopped moving to the data processing position electric current flows through the plunger PL so as to attract the plungers PL to each other at step S352. Then, the motor $M_1$ is rotated forward at step S353. Thus, the first rod 8 is unlocked from the second rod 9, and consequently, the magnetic head section 1 is located in the data processing position. The microcomputer CP waits until the switch $S_7$ is turned off at step S354. When the switch $S_7$ is turned off, the timer for counting time which is required for sending one frame to the film winding chamber starts. Then, at step S356, the photointerrupter PI is detected to change in a film from perforations. At step S358, the content of the register PI is incremented by "1". It is decided at step S359 whether or not PC=2. If yes, i.e., if the perforations $PFA_M$ and $PFB_M$ positioned at the leading end of the M-th frame in the film sending direction pass the photointerrupter PI, the frame number i is incremented by "1" at step S360 and a signal outputted from the magnetic head HD is read at step S361. Then, it is decided at step S362 based on the read data whether or not the M-th frame is exposed. If yes, "1" is set in an i-th area EX (i) of the RAM map corresponding to each frame at step S363. If no, the area EX (i) is reset to "0" at step S364 and the frame number is increased 1 at step S365. It is decided at step S366 whether or not the perforation $PFA_{M+1}$ reaches the position of the photointerrupter PI. If yes, the register PC is reset to "0" at step S367, and the timer for counting time which is required for sending one frame starts at step S368. Then, the program returns to step S356. The above-described operations are repeatedly performed to read the information of each frame, make decisions and form RAM map. Thus, the film is sent from the cartridge 71 to the spool 75.

If the perforations $PFA_{N+1}$ and $PFB_{N+1}$ positioned at the rear end of the last frame #N are detected and then, the last perforation PFE of the film is detected, it is decided that no subsequent perforations are formed on the film. Therefore, since the film is tense, a decision is not made at step S356. At step S357, the counting of the timer terminates. Thus, the operation for pre-winding the film terminates. Then, the program goes to step S370 shown in FIG. 38. At step S371, the motor $M_1$ is stopped. At step S372, the data reading stops. Since the number of pairs of perforations is greater by one than that of frames to be exposed, the number of frames i and the unexposed frames number FN are decremented by "1" at steps S372 and 373. At step S374, the motor $M_1$ is reversed at step S374 so as to set the magnetic head section 1 in the move-away position. If it is decided at step S375 that the switch $S_7$ is turned on, namely, if the magnetic head section 1 moves away from the data processing position, the motor $M_1$ is stopped at step S376. Then, the plungers PL move away from each other to keep the magnetic head section 1 in the move-away position.

At step S378, the operation for moving the leading frame of unexposed frames to the exposure position 76 is performed. At this step, the greatest frame number j of unexposed frames is retrieved from the RAM map. A value (i−j+1) obtained by adding "1" to the difference between the frame number i (currently, maximum frame number) and the frame number j is set in the register PCC for counting the number of frames to be sent because currently, i=N, and if j=N−1, two pairs of perforations $PFB_{N+1}$, $PFA_{N+1}$ and $PFB_N$, $PFA_N$ pass the photointerrupter PI before an (N−1)th frame reaches the exposure position 76. At step S380, the motor $M_1$ starts a reverse rotation. It is decided at step S381 whether or not the perforation PFE passes the photointerrupter PI. If yes, the register PC is reset to "0" at step S382. It is decided at steps S383 through S385 whether or not a pair of perforations passes the photointerrupter PI. If yes, the frame number (i) is decremented by "1", and the content of the register PCC is also decrement by "1" at steps S386 and S387. If PCC≠0, the program returns to step S382 with the film rewinding operation continued. If PCC=0, i.e., if the unexposed frame arrives at the exposure position 76, the program goes to step 389. If j≠0, the motor $M_1$ is stopped at step S390 and the frame number FN which can be exposed is displayed at step S391, then the program returns to the main routine to stop the operation.

If j=0, i.e., if a cartridge accommodating a film in which all frames are exposed is erroneously loaded into the film loading chamber, it is necessary to rewind the film into the cartridge 71. Therefore, the program goes to step S393 at which it is decided whether or not the leading end of the film passes the photointerrupter PI and a rewinding operation is performed for the predetermined period of time. Then, the motor $M_1$ is stopped at step S396 and a warning indicating that all frames have been exposed is displayed and stop the operation.

Figure 39A:
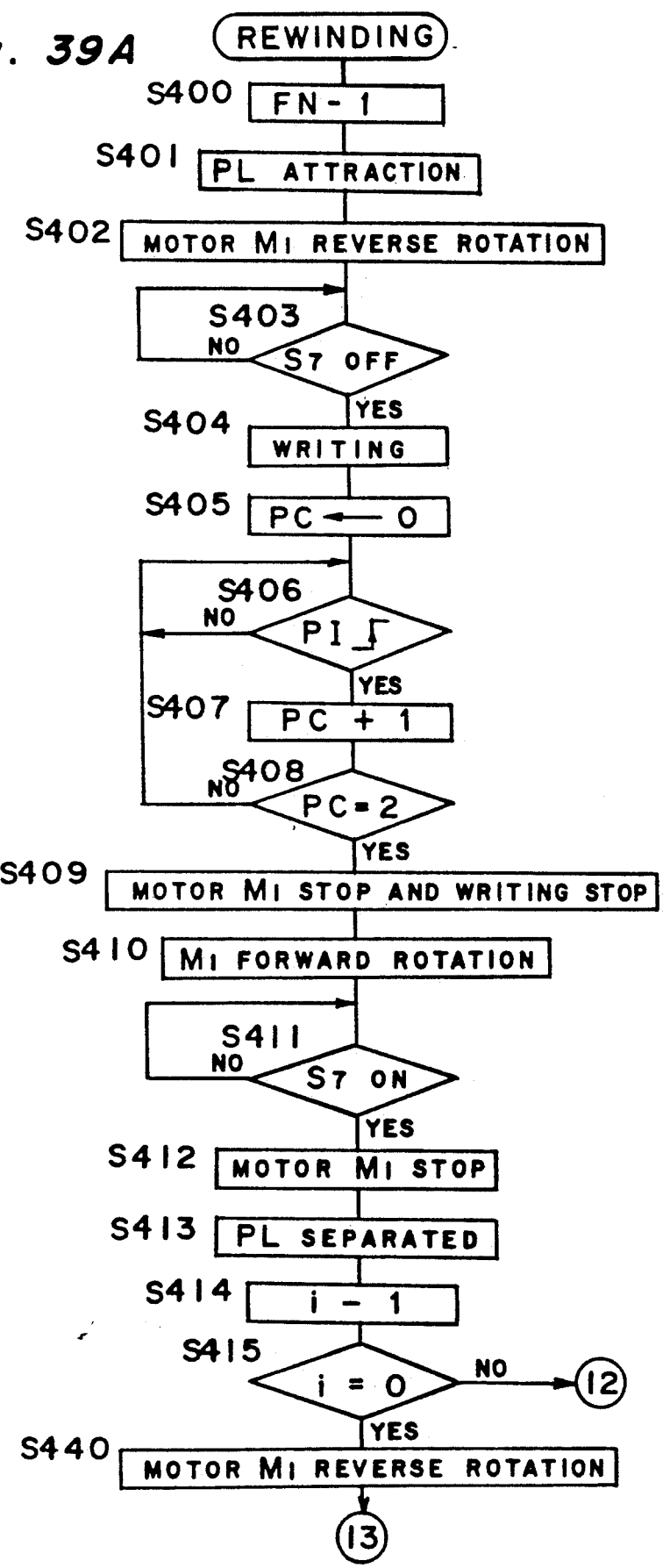
Figure 39B:
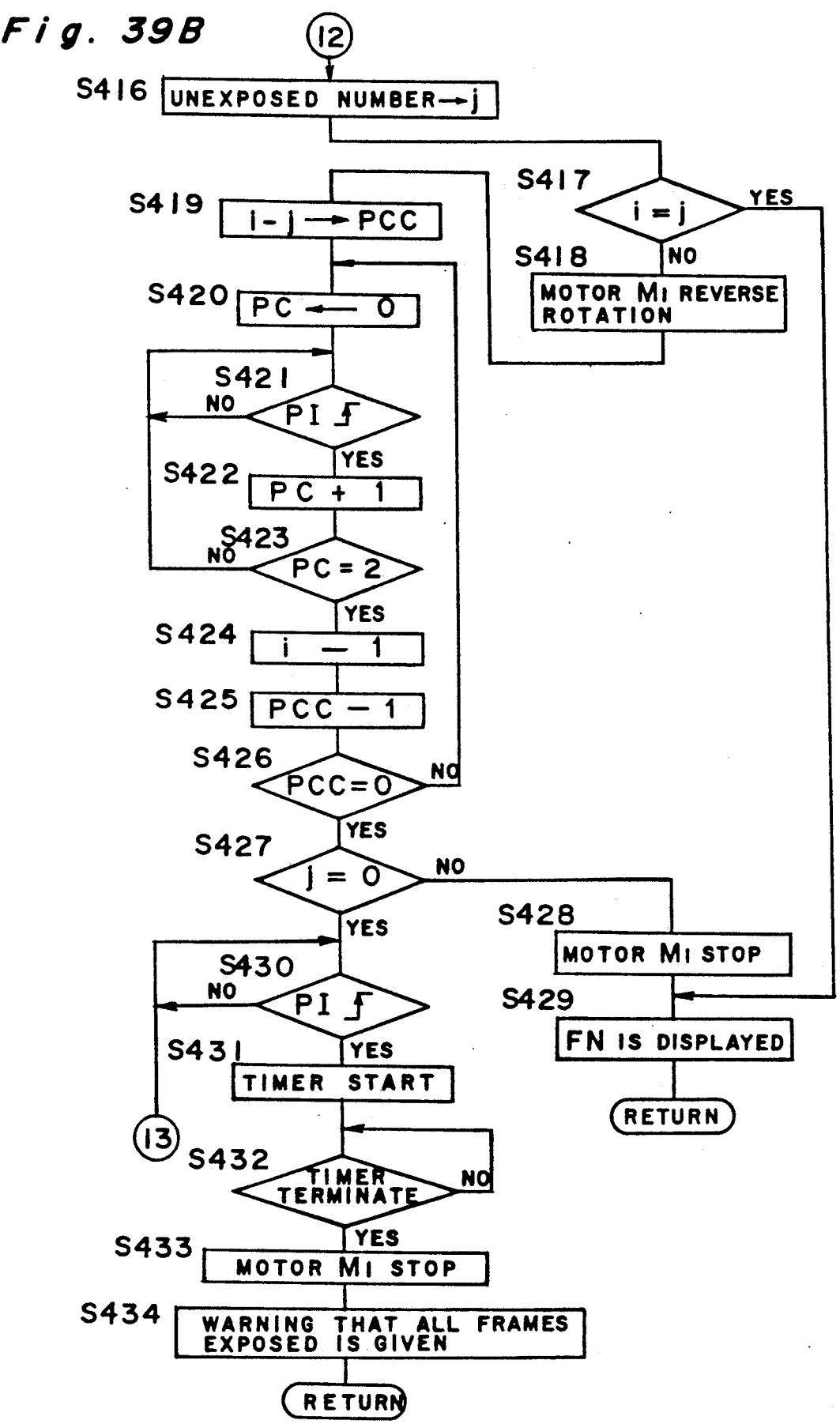

FIG. 39 shows the subroutine for rewinding a film into the cartridge so that the next unexposed frame is located at the exposure position 76 after an exposure control operation terminates.

First, at step S400, the unexposed frame number FN is decremented by "1". It is necessary for the magnetic head HD to write information including data of exposure onto the exposed frame in the rewinding. Therefore, the operation for setting the magnetic head section 1 in the data processing position at steps S401, S402, and S403. At step S404, data is written onto the exposed frame while the motor $M_1$ is reversely rotating. At steps S405, S406, S407, and S408, the microcomputer CP waits until a pair of perforations pass the photointerrupter PI. If the passing is detected, the data writing and the motor $M_1$ are stopped at step S109. When an (M−1)th frame is exposed at this point, the film condition is as shown in FIG. 33.

Then, at steps S410, S411, S412, and S413, the magnetic head section 1 is set in the move-away position and the frame number (i) is reduced by "1". If i=0 at step S415, it follows that the first frame is exposed and the frame is rewound. Then, the program goes to step S440. If i≠0, the next frame number j is retrieved at step S416 and it is decided at step S417 whether i=j or not. If i=j, it follows that the next unexposed frame is positioned in the exposure position 76 by the above-mentioned rewinding. At step S429, the unexposed frame number FN is displayed and the program returns to the main routine.

If i≠j, i.e., if the unexposed frame is not in the exposure position 76, the film is rewound at step S418 and the difference i−j of the frame number between the current frame number i and the unexposed frame number j is set in the register PCC at step S419, and the film is rewound by the set frame number (i−j) by counting the number of perforations at step S420 through step S426. When the rewinding of the film is completed, it is decided at step S427 whether or not j=0, i.e., whether or not unexposed frames have been exposed. If no, the motor M₁ is stopped and the number FN of frames to be exposed is displayed at step S428 and step S429. Then, the program returns to the main routine. If yes, the leading area of the film is rewound into the film loading chamber at steps S430 through S433, and a warning indicating that all frames have been exposed is displayed at step S434. Then, the program returns to the main routine. If it is decided at step S415 that i=0, i.e., if the film winding chamber accommodates no film, the motor M₁ is reversed again at step S440, and similar to from step 430 the leading area of the film is rewound, a warning indicating that all frames have been exposed is displayed, and the program returns to the main routine.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A photographic camera capable of using a film having a magnetic surface, comprising:
    first means for transporting a leading end of a filmstrip included in a film cartridge loaded in the camera to a predetermined position;
    means for discriminating whether or not the leading end of the filmstrip has been properly transported by said transporting means;
    means for rewinding the filmstrip transported by said transporting means into said film cartridge when said discriminating means discriminates that said transportation of the leading end of the filmstrip by said transporting means has failed;
    means for re-starting the operation of said transporting means after the operation of said rewinding means has terminated;
    means for limiting operation of said re-starting means to a predetermined number of times;
    magnetic means for magnetically writing information on said magnetic surface provided on the filmstrip and/or magnetically reading information previously recorded on said magnetic surface; and
    means for bringing the magnetic means to an operable condition in which said magnetic means can write information onto the magnetic surface provided on the filmstrip or can read information recorded onto the magnetic surface, in response to a determination by said discriminating means that said transportation of the leading end of the filmstrip by said transporting means has been properly completed.

2. A photographic camera as claimed in claim 1, further including second transporting means including a driving source means for generating a driving force for transporting said filmstrip, and wherein said magnetic means includes a magnetic head that is relatively movable with respect to said magnetic surface, and said bringing means includes means for bringing said magnetic head into contact with the magnetic surface provided on the filmstrip by the driving force generated by said driving source means.

3. A photographic camera as claimed in claim 2, wherein said driving source means includes a motor for generating said driving force.

4. A photographic camera as claimed in claim 2, further comprising means for maintaining said magnetic head at its operable condition, and means for interrupting the operation of said magnetic head maintaining means in response to the operation of said second transporting means.

5. A photographic camera as claimed in claim 1, further comprising means for detecting whether or not each frame has already been photographed.

6. A photographic camera as claimed in claim 5, further comprising means for transporting the filmstrip so that an unexposed frame can be photographed on the basis of the detected result of said detecting means.

7. A photographic camera capable of using a film having a magnetic surface, comprising:
    a film loading chamber into which a film cartridge having a filmstrip can be loaded;
    an exposing chamber into which a frame provided on said filmstrip can be transported to be exposed, said exposing chamber being connected with said film loading chamber;
    a film winding chamber into which the filmstrip can be wound after being exposed, said film winding chamber being connected with said exposing chamber;
    means, operable in response to the loading of a film cartridge into said film loading chamber, for transporting a leading end of a filmstrip in the film cartridge loaded in said film loading chamber to said film winding chamber through said exposing chamber;
    means for discriminating whether the leading end of the filmstrip is transported to a predetermined position in said film winding chamber within a predetermined time period;
    means for rewinding said filmstrip into the film cartridge when said discriminating means discriminates the filmstrip fails to be transported to the predetermined position in said film winding chamber within said predetermined time period;
    means for re-starting the operation of said film transporting means after the operation of said film rewinding means;
    means for limiting operation of said re-starting means to a predetermined number of times;
    means for magnetically reading information recorded on said magnetic surface provided on the filmstrip; and means for bringing the magnetic reading means to an operable condition in which said magnetic reading means can read information recorded on the magnetic surface, in response to a determination by said discriminating means that the leading end of the filmstrip is transported to the predetermined position in said film winding chamber within the predetermined time period.

8. A photographic camera as claimed in claim 7, further comprising a film winding spool located in said film winding chamber, and wherein said discriminating means includes means for detecting that the filmstrip transported by said transporting means is caught by said film winding spool.

9. A photographic camera capable of using a film cartridge in which an entire filmstrip including a leading end is wholly retracted, the filmstrip having a magnetic surface, comprising:

a film loading chamber into which said film cartridge can be loaded;

an exposing chamber into which a frame provided on said filmstrip can be transported to be exposed, said exposing chamber being connected with said film loading chamber;

a film winding chamber into which the filmstrip can be wound after being exposed, said film winding chamber being connected with said exposing chamber;

means, operable in response to the loading of a film cartridge into said film loading chamber, for transporting a filmstrip in the film cartridge loaded in said film loading chamber to said film winding chamber through said exposing chamber;

means for discriminating whether the filmstrip is transported to said film winding chamber within a predetermined time period;

means for rewinding said filmstrip into the film cartridge when said discriminating means discriminates the filmstrip fails to be transported to said film winding chamber within said predetermined time period, said reminding means rewinding completely all of the filmstrip including said leading end thereof into the film cartridge;

means for re-starting the operation of said film transporting means after the operation of said film rewinding means; and means for limiting operation of said re-starting means to a predetermined number of times.

10. A photographic camera as claimed in claim 9, further comprising a film winding spool located in said film winding chamber, and wherein said discriminating means includes means for detecting the filmstrip transported by said transporting means is caught by said film winding spool.

11. A photographic camera capable of using a film having a magnetic surface, comprising:

means for transporting a leading end of a filmstrip included in a film cartridge loaded in the camera to a predetermined position;

means for discriminating whether or not the leading end of the filmstrip has been properly transported by said transporting means;

means for rewinding the filmstrip transported by said transporting means into said film cartridge when said discriminating means discriminates that said transportation of the leading end of the filmstrip by said transporting means has failed;

means for re-starting the operation of said transporting means after the operation of said rewinding means has terminated;

a magnetic head for magnetically writing information on said magnetic surface provided on the filmstrip and/or for magnetically reading information previously recorded on said magnetic surface; and means for allowing the filmstrip to be out of contact with said magnetic head during operation of said transporting means and, in response to a determination by said discriminating means that the leading end of the filmstrip has been properly transported, for bringing said magnetic head and the filmstrip into contact with one another to thereby enable said magnetic head to write information onto the magnetic surface provided on the filmstrip or read information recorded on the magnetic surface,

* * * * *